US007412585B2

(12) United States Patent
Uemura

(10) Patent No.: US 7,412,585 B2
(45) Date of Patent: Aug. 12, 2008

(54) METHOD FOR CONTROLLING DISK DRIVE USING AN ADDRESS TRANSLATION TABLE

(75) Inventor: Tetsuya Uemura, Saitama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 398 days.

(21) Appl. No.: 11/097,396

(22) Filed: Mar. 31, 2005

(65) Prior Publication Data

US 2005/0223154 A1 Oct. 6, 2005

(30) Foreign Application Priority Data

Apr. 2, 2004 (JP) ............................. 2004-110413

(51) Int. Cl.
G06F 9/26 (2006.01)
G06F 9/34 (2006.01)
G06F 12/00 (2006.01)
G06F 12/02 (2006.01)
G06F 12/06 (2006.01)
G06F 13/00 (2006.01)
G06F 13/28 (2006.01)
G06F 3/00 (2006.01)
G06F 3/06 (2006.01)

(52) U.S. Cl. .............................. 711/207; 711/1; 711/2; 711/4; 711/6; 711/100; 711/111; 711/112; 711/113; 711/118; 711/202; 711/205; 710/9

(58) Field of Classification Search ........................ None
See application file for complete search history.

(56) References Cited

U.S. PATENT DOCUMENTS

| 4,467,421 | A | 8/1984 | White |
| 5,124,987 | A | 6/1992 | Milligan et al. |
| 6,105,103 | A * | 8/2000 | Courtright et al. ............. 711/1 |
| 6,467,014 | B1 * | 10/2002 | Bolt ............................... 711/4 |
| 6,484,234 | B1 * | 11/2002 | Kedem ........................ 711/113 |
| 6,693,754 | B2 * | 2/2004 | Noble et al. .................. 360/53 |
| 6,886,068 | B2 * | 4/2005 | Tomita .......................... 711/4 |
| 2001/0047451 | A1 * | 11/2001 | Noble et al. ................ 711/111 |
| 2005/0144517 | A1 * | 6/2005 | Zayas ............................ 714/8 |

FOREIGN PATENT DOCUMENTS

JP 11-085589 3/1999

OTHER PUBLICATIONS

Patterson et al., "A Case for Redundant Arrays of Inexpensive Disks (Raid)," *Proceedings of International Conference on Management of Data* (SIGMOND), Jun. 1988, pp. 109-116.
Rosenblum et al., "The Design and Implementation of a Log-Structured File System," *ACM Transactions on Computer Systems*, vol. 10, No. 1, Feb. 1992, pp. 3-25.

* cited by examiner

*Primary Examiner*—Donald Sparks
*Assistant Examiner*—Frederick W Detschel
(74) *Attorney, Agent, or Firm*—Townsend and Townsend and Crew LLP; Patrick Duncan

(57) ABSTRACT

Embodiments of the invention achieve data write in an appending manner by conversion from a logical block address to a physical block address in a HDD that has only one storage device and does not have a large-scale cache memory. In one embodiment, a check is made as to whether or not the size of an address translation table in a cache memory exceeds a threshold value. If the size exceeds the threshold value, entries whose number is specified are selected by the LRU method. The selected entries are added to a WRITE buffer, and the address translation table is saved on the HDD by executing WRITE. Seek time of a head at the time of WRITE is reduced, thereby improving WRITE performance. There is produced an effect of building such a snapshot that while a usual access to a HDD volume is allowed, it is possible to make an access to a volume of the snapshot which is a past state of the HDD. Disabling write after writing to the HDD is disabled. Thus, it possible to roll back to a HDD state at an arbitrary point of time.

22 Claims, 13 Drawing Sheets

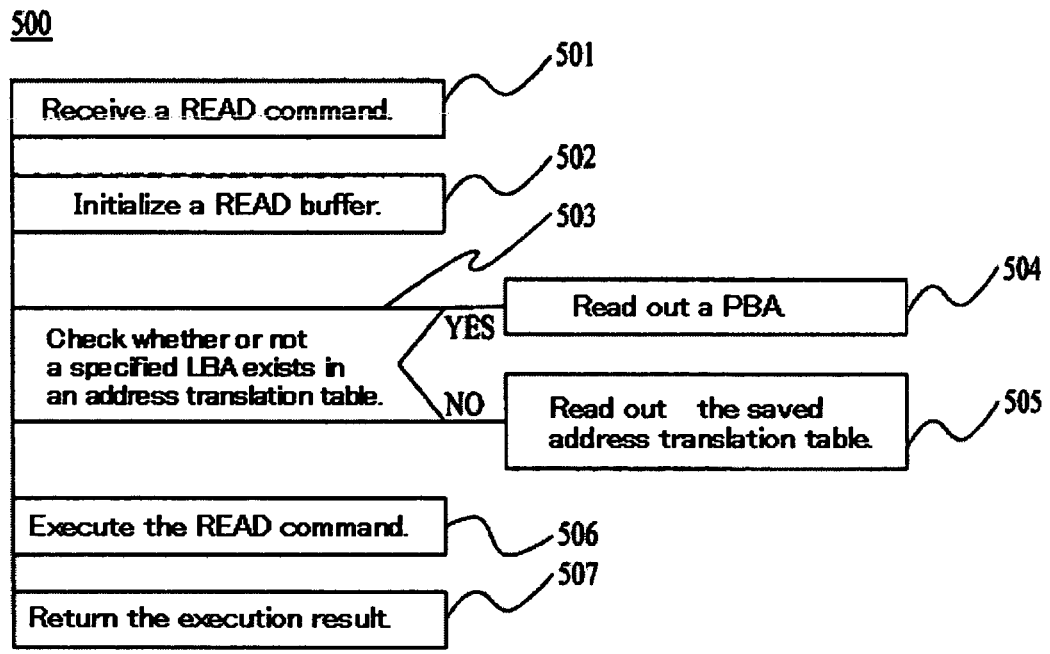
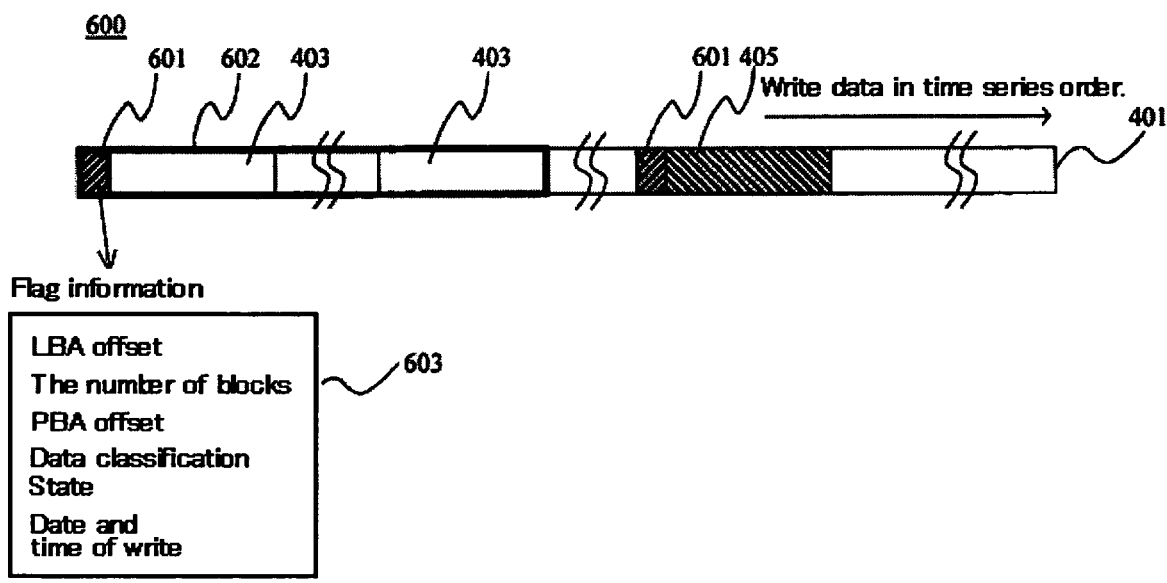

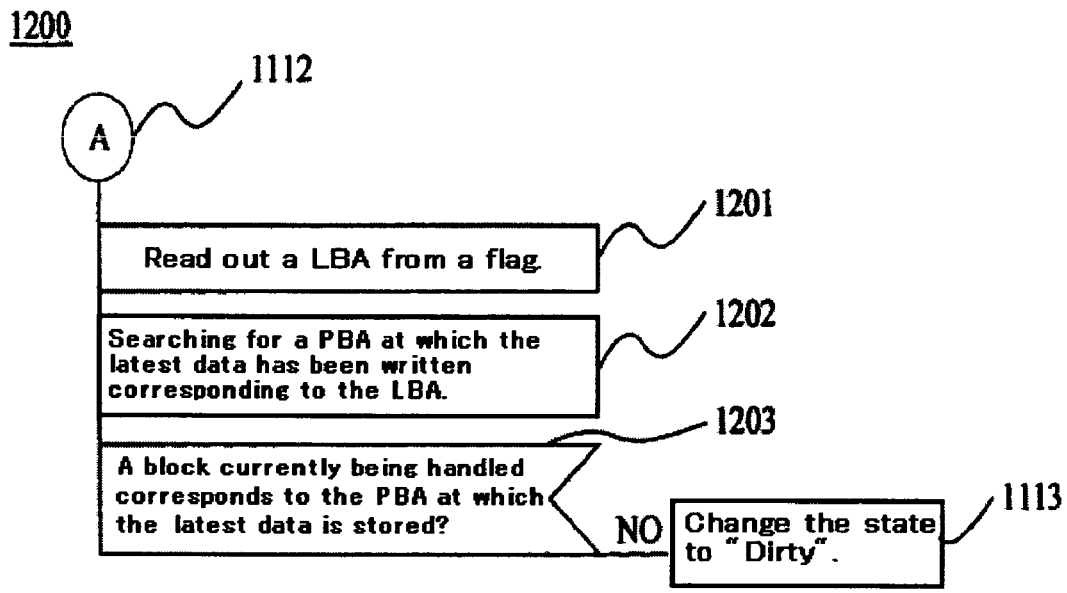
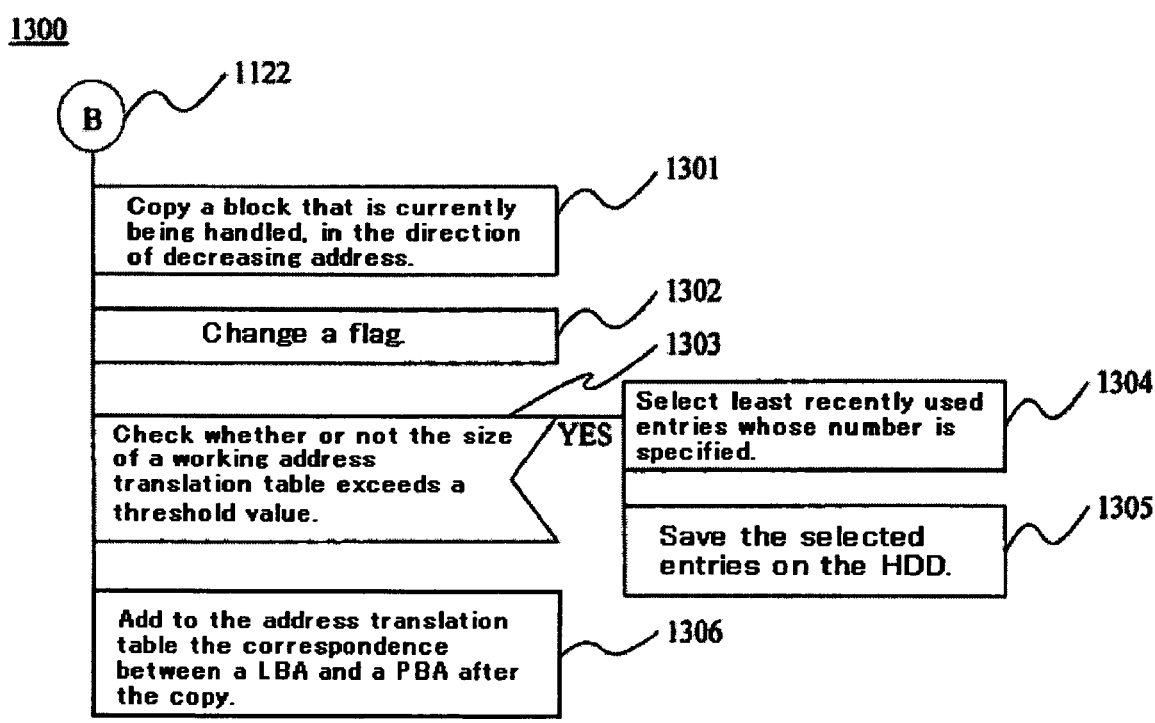

| Byte\Bit | 7 | 6 | 5 | 4 | 3 | 2 | 1 | 0 |
|---|---|---|---|---|---|---|---|---|
| 0 | OPERATION CODE (8Ah) | | | | | | | |
| 1 | WPROTECT | | | DPO | FUA | RESERVED | | RESERVED |
| 2 | (MSB) | | | | | | | |
| 9 | LOGICAL BLOCK ADDRESS | | | | | | | (LSB) |
| 10 | (MSB) | | | | | | | |
| 13 | TRANSFER LENGTH | | | | | | | (LSB) |
| 14 | RESERVED | | | | | | | |
| 15 | CONTROL | | | | | | | |

Fig.16
| Byte \ Bit | 7 | 6 | 5 | 4 | 3 | 2 | 1 | 0 | |
|---|---|---|---|---|---|---|---|---|---|
| 0 | OPERATION CODE (88h) ||||||||  1601 |
| 1 | PROTECT ||| DPO | FUA | RESERVED ||| |
| 2 | (MSB) |||||||| 1602 |
| 9 | LOGICAL BLOCK ADDRESS                 (LSB) |||||||| |
| 10 | (MSB) |||||||| 1603 |
| 13 | TRANSFER LENGTH                     (LSB) |||||||| |
| 14 | RESERVED |||||||| |
| 15 | CONTROL |||||||| |
1600
Fig.17
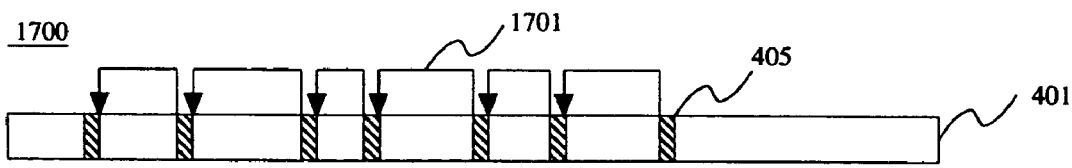
Fig.18
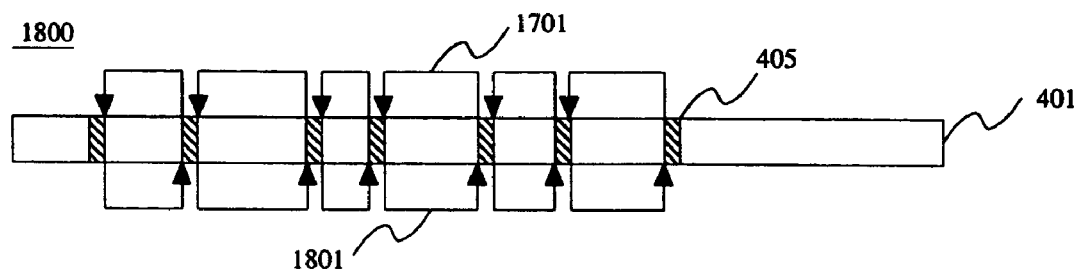

METHOD FOR CONTROLLING DISK DRIVE USING AN ADDRESS TRANSLATION TABLE

CROSS-REFERENCES TO RELATED APPLICATIONS

This application claims priority from Japanese Patent Application No. JP2004-110413, filed Apr. 2, 2004, the entire disclosure of which is incorporated herein by reference.

BACKGROUND OF THE INVENTION

The present invention relates to a method for controlling a disk drive, and more particularly to a method for controlling a disk drive that is resistant to failure.

The conventional disk drive (hereinafter referred to as HDD) converts a logical block address specified by a host into a physical block address that is unique in the HDD, and thereby accesses a storage medium in the HDD. Usually, the address conversion is performed by use of a conversion formula in which the number of cylinders of the HDD, the number of heads of the HDD, the number of sectors per track, and the like, are used as parameters. Accordingly, even if the HDD is equipped with a low performance processor and a small-capacity memory, the HDD can convert a logical block address into a physical block address or vice versa at sufficiently high speed. However, the address conversion performed by use of such a conversion formula results in a one-to-one correspondence between a logical block address and a physical block address. This means that writing to one and the same logical block address erases the contents written therein before.

Such operation usually produces no problem. However, if an operation error or a computer virus causes data that must not be deleted to be overwritten, data in the HDD is lost. If the data is not backed up to an external HDD, the data is lost forever. This occurs because even if a command is illegal judging from the intention of a user, when the command is acceptable as a command identified by the HDD, the HDD executes the command without recognizing the intention of the user.

As far as large-size disk array devices are concerned, a method for assigning a storage area on a storage device, which is different from the address conversion by use of the conversion formula as described above, is proposed. In the U.S. Pat. No. 4,467,421 "VIRTUAL STORAGE SYSTEM AND METHOD", every time a write request is received from a host, a required area is reserved from a plurality of storage devices, and then data is written. As a result, even if a usual block device command is used, it is possible to write data to a new area without erasing an existing area.

In the RAID level 4 or 5 of the RAID system (D. A. Patterson, G. A. Gibson, R. H. Katz, "A Case for Redundant Arrays of Inexpensive Disks (RAID)", Proceedings of the international Conference on Management of Data (SIGMOD), June 1988, PP. 109-116) proposed by Patterson, and others, at every write a parity is read out and updated before the parity is written back. As a result, a write penalty occurs, which produces a problem of the decrease in write performance. As a solution to cope with this problem, U.S. Pat. No. 5,124,987 "LOGICAL TRACK WRITE SCHEDULING SYSTEM FOR A PARALLEL DISK DRIVE ARRAY DATA STORAGE SUBSYSTEM" proposes that newly written data and parity data generated on the fly are written in an area in a new storage device.

U.S. Pat. Nos. 4,467,421 and 5,124,987 require a mapping table for managing the correspondence between a logical block address specified by a host and a physical block device in a storage device. Even if a failure does not occur in the storage device, when a failure occurs in the mapping table, data in the storage device cannot be accessed. Since the mapping table requires high reliability, even if a failure occurs in the mapping table due to some accident, it is necessary to rebuild the mapping table. As a solution to this problem, there is proposed "Information storage device, and management data rebuilding method applied to the information storage device" described in Japanese Patent Laid-open No. 11-85589.

Japanese Patent Laid-open No. 11-85589 proposes the following mapping table rebuilding method: saving a value of a logical block address specified by a host in an user data storage area; and in the event that a failure occurs in the mapping table, rebuilding a mapping table by reading out values of all logical block addresses written to the user data storage area. In addition to it, Japanese Patent Laid-open No. 11-85589 also proposes the following method: if a write has been made to the same logical block address more than once, generating a sequence number indicating the order of writes; saving this sequence number in the user data storage area together with the value of the logical block address; and in the event that a failure occurs in the mapping table, determining the latest write from the sequence number saved in the user data storage area.

U.S. Pat. Nos. 4,467,421 and 5,124,987 disclose techniques in which a new area is allocated in the storage subsystem that looks like a simple block device from the host. Another method is the Log-Structured File System proposed by Rosenblum, and others (M. Rosenblum, and J. K. Ousterhout, "The Design and Implementation of a Log-Structured File System", ACM Transactions on Computer System, Vol. 10, No. 1, February 1992, pp. 3-25). In the Log-Structured File System (hereinafter referred to as LFS), blocks are allocated in a manner that appending is performed for a usual block device at a file system level. As compared with the speedup of processors and semiconductor memories, the speedup of HDDs does not progress. The LFS is one of techniques originally devised as a solution to the speedup of HDDs. In a usual file system, at the time of writing to a HDD, a period of time which is allowed to be used for data transfer from a host to the HDD is reduced by seek time of a head. As opposed to this, in the LFS, all processing for the file system including meta information, which is management information of the file system for managing file deletion, and the like, is appended to the HDD as a log. This reduces the head seek time at the time of writing, and sequential writes achieve the speedup of writing.

BRIEF SUMMARY OF THE INVENTION

U.S. Pat. Nos. 4,467,421 and 5,124,987 are premised on a large-scale disk array device, and therefore a plurality of storage devices and a large-scale cache memory are indispensable. Because of it, the above-mentioned techniques cannot be applied to a HDD that has only one storage device and does not have a large-scale cache memory. In addition, the control of area allocation differs from that in the LFS, and more specifically, the control is not intended for the decrease in head seek time at the time of writing. Accordingly, high-speed writing is not always achieved.

In the event that some failure occurs in the system, an image of the storage at the point of time when the system normally operates may be required for recovery. However, with the increase in capacity of HDDs, a period of time required to back up a storage subsystem to an external device such as a tape, and a period of time required to restore a storage image from the backup to the storage subsystem, increase. It is desirable that all update histories be accumulated in the storage subsystem, and that a snapshot which is an image of the storage at an arbitrary point of time be generated at high speed so that the snapshot can be accessed from the host. However, U.S. Pat. Nos. 4,467,421 and 5,124,987 do not have such a snapshot function.

The mapping table building method according to Japanese Patent Laid-open No. 11-85589 also requires as a prerequisite a large-scale memory into which the whole mapping table can be loaded at a time. Because of it, the mapping table building method cannot be applied to a HDD that cannot be equipped with such a large-scale memory. Moreover, when a mapping table is rebuilt, values of all logical block addresses that have been written to the storage device must be read out. Accordingly, very long processing time is required. If a long period of time can be spared for rebuilding the mapping table with the object of recovering from a failure of the mapping table that extremely rarely occurs, this long processing time may be acceptable. However, in view of the processing for building a snapshot at an arbitrary point of time, there is a possibility that such recovery processing will frequently occur. Therefore, spending long processing time cannot be accepted.

Since the LFS is a file system, only OSs supporting the LFS can utilize the LFS. The LFS, therefore, cannot be applied to an arbitrary OS, or an arbitrary file system. Further, the LFS cannot be applied to save of block data. In addition, when a certain area becomes unnecessary as a result of erasing a file, a cleaner process reclaims the area so that the area can be used again as an unused area. For this reason, a snapshot function cannot be realized.

A first feature of the present invention is to provide a method for controlling a disk drive, in which irrespective of a value of a logical block address specified by a host, data is appended to the end of existing data, and the correspondence between a logical block address and a physical block address is managed by an address translation table.

A second feature of the present invention is to provide a method for controlling a disk drive, in which in the case of write to a plurality of consecutive logical block addresses, a plurality of consecutive physical block addresses are reserved at the end of existing data before writing data in an append manner, and then the correspondence between a logical block address and a physical block address is managed by the address translation table that is encoded using the characteristic that write to consecutive addresses is performed.

A third feature of the present invention is to provide a method for controlling a disk drive, in which if the number of entries stored in an address translation table in a temporary storage area exceeds a certain threshold value, entries to be saved are selected, in decreasing order of elapsed time after the last use, from entries that are least recently used, and are then written to the end of existing data in an append manner to save the selected entries.

A fourth feature of the present invention is to provide a method for controlling a disk drive, in which when an address translation table is saved, a value of a physical block address at which the address translation table has been saved last time is also saved together.

A fifth feature of the present invention is to provide a method for controlling a disk drive, in which on a specific area in a storage medium of a HDD, an address translation table capable of storing the correspondences of all logical block addresses and all physical block addresses, which can be specified by a host, is managed.

A sixth feature of the present invention is to provide a method for controlling a disk drive, in which an address translation table is searched by a value of a logical block address specified by a host to read out a value of a physical block address corresponding to the value of the logical block address, and thereby data is read out from the physical block address.

A seventh feature of the present invention is to provide a method for controlling a disk drive, in which if a value of a logical block address specified by the host does not exist in the address translation table, a value of a physical block address corresponding to the value of the logical block address is searched for from the address translation table saved in the storage medium of the HDD.

An eighth feature of the present invention is to provide a method for controlling a disk drive, in which in a specific area on a storage medium of a HDD, an address translation table capable of storing the correspondences of all logical block addresses and all physical block addresses, which can be specified by the host, is searched to read out a value of a physical block address corresponding to a value of the logical block address specified by the host.

A ninth feature of the present invention is to provide a method for controlling a disk drive, in which an address translation table is rebuilt by use of an address translation table that has been saved on a storage medium of the HDD last, a value of a physical block address of each block that has been written after the address translation table has been saved, and a value of a logical block address that has been written to a management area corresponding to the block.

A tenth feature of the present invention is to provide a method for controlling a disk drive, in which an address translation table is rebuilt by use of a value of a physical block address of each block, and a value of a logical block address that has been written to a management area corresponding to the block, from a start address of a storage medium of the HDD toward its end address.

An eleventh feature of the present invention is to provide a method for controlling a disk drive, in which an address translation table is rebuilt by use of a saved address translation table, from a start address of a storage medium of the HDD toward its end address, and by use of a value of a physical block address of each block and a value of a logical block address that has been written to a management area corresponding to the block, from an address at which an address translation table has been saved last, toward an end address.

A twelfth feature of the present invention is to provide a method for controlling a disk drive, in which starting from the top physical block address of a storage medium of the HDD, within a separately specified range of physical block addresses, each block is checked whether or not write to a higher physical block address is performed for the same logical block address, and if a write is made to the higher physical block address, an area in the storage medium is reused by shifting data so as to overwrite the block.

A thirteenth feature of the present invention is to provide a method for controlling a disk drive, in which it is possible to make access to a snapshot that is a past state of the HDD.

A fourteenth feature of the present invention is to provide a method for controlling a disk drive, in which contents written to the HDD are disabled, and thereby returning to a past state is possible.

A fifteenth feature of the present invention is to provide a method for controlling a disk drive, in which at the time of writing to a block, the length of operating time of the HDD is written to a management area of the block.

A sixteenth feature of the present invention is to provide a method for controlling a disk drive, in which it is possible to make access to a management area of the HDD by use of usual write and read commands.

A seventeenth feature of the present invention is to provide a method for controlling a disk drive, in which it is possible to access an internal data structure that is written to a recording medium of the HDD.

An eighteenth feature of the present invention is to provide a method for controlling a disk drive, in which management data written in a temporary area, corresponding to each block of the recording medium of the HDD, can be read out.

A nineteenth feature of the present invention is to provide a method for controlling a disk drive, in which if no write request comes from the host for a given period of time, an identifier can be added to a management area of a block to which write has been made last.

A twentieth feature of the present invention is to provide a method for controlling a disk drive, in which at the time of writing to a block, the date and time of write, specified by the host, is written to a management area of the block.

According to embodiments of the present invention, when converting a logical block address specified by a host in a write request into a physical block address of a storage medium inside a HDD, address conversion is performed so that new data is added to the end of existing data; and in addition to it, a correspondence table for storing the correspondence between a logical block address and a physical block address is managed. When receiving a read request, the control is performed so that from the correspondence table for storing the correspondence between a logical block address and a physical block address, data is read out from a physical block address that has been converted last for a requested logical block address.

According to one aspect of the present invention, there is provided a method for controlling a disk drive including: a storage medium; and a control unit that transmits/receives a command and data to/from a host to control write or read to or from the storage medium. The method comprises the steps of: receiving a write command from the host; reading out a logical block address included in the write command; when converting the read logical block address into a physical block address of the storage medium, converting this logical block address into the next physical block address of a physical block address at which data has been written most recently so that data can be written to an unused area of the storage medium in an append manner; writing data specified by the host at the converted physical block address; and writing a value of the logical block address specified by the host to a management area corresponding to the converted physical block address.

When it is detected that the host has issued a write command for a plurality of consecutive logical block addresses, it is desirable that the plurality of consecutive logical block addresses be converted into a plurality of consecutive physical block addresses, and that one management area corresponding to the plurality of consecutive physical block addresses be allocated to write values of the plurality of consecutive logical block addresses specified by the host to the one management area by an arbitrary encoding method that also has a decoding function. A start logical block address, and the size of a consecutive write, can be used for the encoding method.

The control unit may further perform the steps of:
storing, as one entry, the correspondence between a logical block address and a physical block address, or the correspondence of a plurality of consecutive logical block addresses and a plurality of consecutive physical block addresses, in an address translation table in a temporary storage area;

comparing the number of entries stored in the address translation table with the allowable number of entries that is separately specified;

as a result of the comparison, if the number of stored entries exceeds the allowable number of entries, selecting entries to be saved, the number of which is separately specified, from entries that are least recently used, in decreasing order of elapsed time after the last use;

selecting the next physical block address of the physical block address at which a write has been made most recently;

saving, to the storage medium, the address translation table in the temporary storage area by writing contents of the selected entries at the selected physical block address; and writing a flag, indicating that written data is an entry of the address translation table, to a management area corresponding to the selected physical block address.

A value of the selected physical block address is saved in the temporary storage area; and when saving the address translation table in the storage medium, not only contents of the selected entries but also a value of a physical block address that was used when the address translation table stored in the temporary storage area has been saved in the storage medium last time, may also be written to the storage medium. The correspondence of a logical block address and a physical block address may also be stored as one entry in an address translation table capable of storing the correspondences of all logical block addresses and all physical block addresses that can be specified by the host, in a specific area in the storage medium. The address translation table can be provided in a management area or a user data area of the storage medium.

The control unit may further perform the steps of: receiving a read command from the host; reading out a logical block address included in the read command; reading out an entry corresponding to the logical block address from the address translation table in the temporary storage area, the address translation table storing as one entry the correspondence between the logical block address and a physical block address; reading out the physical block address from the read entry; reading out data at the physical block address of the storage medium; and transmitting the read data to the host.

If an entry corresponding to the logical block address does not exist in the address translation table in the temporary storage area, the address translation table saved in the storage medium is searched for the entry corresponding to the logical block address.

The control unit may further perform the steps of: receiving a read command from the host; reading out a logical block address included in the read command; reading out an entry corresponding to the logical block address from an address translation table capable of storing the correspondences of all logical block addresses and all physical block addresses, which can be specified by the host, in a specific area on the storage medium; reading out the physical block address from the read entry; reading out data at the physical block address of the storage medium; and transmitting the read data to the host.

A logical block address that has been specified when the host has written at the physical block address is read out from a management area corresponding to the physical block address; and then a logical block address read out from a read command is compared with the logical block address read out from the management area; and if both of the logical block addresses disagree with each other, an error is returned to the host.

The control unit may further perform the steps of: initializing an address translation table in a temporary storage area, said address translation table storing as one entry the correspondence between a logical block address and a physical block address; starting from a physical block address at which a write has been made most recently, searching for a block, in which the address translation table has been saved, in the direction of lower physical block address; reading out the block in which the address translation table has been saved, the block having been found by the search step, and then restoring the address translation table in the temporary storage area by use of the block; starting from the next physical block address of the saved block toward a physical block address at which a write has been made most recently, reading out a physical block address of the block, and from a management area corresponding to the physical block address, reading out a logical block address that has been specified by the host when writing at the physical block address; and saving as one entry the correspondence between a physical block address and a logical block address in the address translation table in the temporary storage area.

The control unit may further perform the steps of: initializing the address translation table in the temporary storage area, said address translation table storing as one entry the correspondence between a logical block address and a physical block address; starting from the lowest physical block address toward a physical block address at which a write has been made most recently, reading out a physical block address of a block, and from a management area corresponding to the physical block address, reading out a logical block address that has been specified by the host when writing at the physical block address; and saving as one entry the correspondence between a physical block address and a logical block address in the address translation table.

The control unit may further perform the steps of: initializing the address translation table in the temporary storage area, the address translation table storing as one entry the correspondence between a logical block address and a physical block address; starting from the lowest physical block address toward a physical block address at which a write has been made most recently, searching for a block in which the address translation table has been saved; reading out the block in which the address translation table has been saved, the block having been found by the search step, and then adding the block to the address translation table in the temporary storage area; comparing the number of entries stored in the address translation table with the allowable number of entries that is separately specified; as a result of the comparison, if the number of stored entries exceeds the allowable number of entries, selecting entries to be deleted, the number of which is separately specified, from entries that are least recently used, in decreasing order of elapsed time after the last use; deleting the selected entries from the address translation table; starting from the next physical block address of the saved block, which has been read last, toward a physical block address at which a write has been made most recently, reading out a physical block address of the block, and from a management area corresponding to the physical block address, reading out a logical block address which has been specified by the host when writing at the physical block address; and saving as one entry the correspondence between a physical block address and a logical block address in the address translation table in the temporary storage area.

Only when data saved in a block is user data, a physical block address and a logical block address are read out. In addition, an entry stored in the temporary storage area is written to a corresponding entry in an address translation table capable of storing the correspondences of all logical block addresses and all physical block addresses, which can be specified by the host, in a specific area on the storage medium.

The control unit may further perform the steps of: setting a value of the upper limit physical block address to be handled; starting from the lowest physical block address toward the upper limit physical block address to be handled, for each block, checking whether or not the host is writing at a physical block address higher than a target physical block address to be handled, for the same logical block address as a value of the logical block address that has been specified by the host when writing at the physical block address of the block; if the host is writing at the higher physical block address, writing, in a management area corresponding to the block, a dirty flag indicating that written data at the same logical block address is overwritten by the higher physical block address; and starting from the lowest physical block address toward a physical block address at which a write has been made most recently, for each block, moving a block having no dirty flag in the direction of a lower physical block address so that the block having a dirty flag is overwritten.

The control unit may further perform the steps of: setting a value of the upper limit physical block address to be handled; initializing a second address translation table in the temporary storage area, the address translation table storing as one entry the correspondence between a logical block address and a physical block address; starting from the lowest physical block address toward the upper limit physical block address to be handled, reading out a physical block address of a block, and from a management area corresponding to the physical block address, reading out a logical block address that has been specified by the host when writing at the physical block address; saving as one entry the correspondence between a physical block address and a logical block address in a second address translation table; and when receiving a request from the host, enabling a means for accessing a storage medium, the means performing address conversion between a physical block address and a logical block address by use of the second address translation table.

The control unit may further perform the steps of: setting a value of the lower limit physical block address to be handled; starting from the lower limit physical block address to be handled toward a physical block address at which a write has been made most recently, disabling written blocks for initialization; initializing the address translation table in the temporary storage area, the address translation table storing as one entry the correspondence between a logical block address and a physical block address; starting from the lowest physical block address toward the lower limit physical block address to be handled, reading out a physical block address of a block, and from a management area corresponding to the physical block address, reading out a logical block address that has been specified by the host when writing at the physical block address; and saving as one entry the correspondence between a physical block address and a logical block address in the address translation table.

The control unit may further perform the steps of: reading out the length of operating time of a device; and writing the length of operating time, which has been read out, to a management area corresponding to the converted physical block address, or to one management area corresponding to a plurality of consecutive physical block addresses.

The control unit may further perform the steps of: at the time of retraction of the head, or power off, storing the length of operating time of the device in a management area; when starting up the device, reading out the length of operating time stored in the management area; and initializing the length of operating time of the device by use of the length of operating time that has been read out.

The control unit may further perform the steps of: reading out the command issued date and time from a write command from the host; and writing the command issued date and time that has been read out, to a management area corresponding to the converted physical block address, or to one management area corresponding to a plurality of consecutive physical block addresses.

The control unit may further perform the steps of: receiving from the host a write command or a read command that accesses a logical block address that does not exist on a storage medium; checking whether or not the logical block address is an address for receiving a control command; if the logical block address is an address for receiving a control command, and at the same time, the received command is a write command, reading out data in a data area of the write command; checking whether or not the data is a control command; if the data is a control command, executing the control command; and the logical block address is an address for receiving a control command, and at the same time, the received command is a read command, reading out management information of the storage medium corresponding to the received logical block address; and transmitting to the host the management information of the storage medium which has been read out.

The control unit may further perform the steps of: checking whether or not a command received from the host is a read command that requests a direct reference to an internal data structure of a storage medium; if the command is a read command requesting a direct reference, seeking to an address, which has been specified by the host as a logical block address, as a physical block address in a HDD; reading out user data stored in a block, and management data stored in a management area corresponding to the block; and transmitting the user data and the management data to the host.

The control unit may further perform the steps of: checking whether or not a command received from the host is a read command for reading management data stored in a management area of the storage medium; if the command is a read command for reading management data, reading out management data stored in a management area corresponding to a block, an address specified by the host as a logical block address being used as a physical block address in a storage medium; and transmitting the management data to the host.

The control unit may further perform the steps of: detecting the interval of issuing write commands from the host; checking whether a write command has not been issued for a separately specified period of time after the host has issued the last write command; if a write command has not been issued for the separately specified period of time, adding, to a management area corresponding to a physical block address at which a write has been made most recently, an identifier indicating that a write command has not been issued for the separately specified period of time.

According to the present invention, even in a HDD having only a small-capacity cache memory, irrespective of a LBA value specified by the host, it becomes possible to achieve the disk control of writing in an appending manner without overwriting data to a storage medium of the HDD, which makes it possible to provide a disk drive that is resistant to failure.

BRIEF DESCRIPTION OF THE DRAWINGS

FIG. 5 is a PAD diagram illustrating READ processing of the control method for controlling a disk drive according to the first embodiment of the present invention.

FIG. 6 is a diagram illustrating a data format of a method for controlling a disk drive according to a second embodiment of the present invention.

FIG. 12 is a PAD diagram illustrating a subroutine 1112 of the control method for controlling a disk drive according to the seventh embodiment of the present invention.

FIG. 13 is a PAD diagram illustrating a subroutine 1122 of the control method for controlling a disk drive according to the seventh embodiment of the present invention.

FIG. 16 is a diagram illustrating a READ (16) command of SCSI.

FIG. 17 is a conceptual diagram illustrating a one-way linked list.

FIG. 18 is a conceptual diagram illustrating a bi-directional linked list.

DETAILED DESCRIPTION OF THE INVENTION

Figure 1:
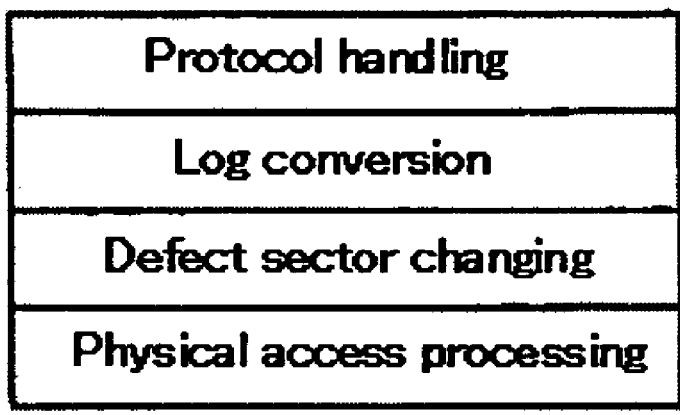
FIG. 1 is a block diagram illustrating software processing layers of a method for controlling a disk drive according to a first embodiment of the present invention.

Embodiments of the present invention will be described with reference to drawings below. It is to be noted that the same reference numerals denote similar parts.

FIG. 1 is a block diagram illustrating software-processing layers of a method for controlling an appending type disk drive, on which data is never overwritten, according to a first embodiment of the present invention. Software-processing layers 100 comprise the following: a protocol handling layer 101 for handling ATA, SCSI, and the like, which are communications protocols between a host and a HDD; a log conversion layer 102 for converting a logical block address (LBA) specified by a host into a physical block address (PBA) that is used to make access in a log format; a defect sector changing layer 103 for changing with a spare sector if a specified PBA is a defect sector; and a physical access processing layer 104 for accessing a storage medium of the HDD at a specified PBA.

Figure 2:
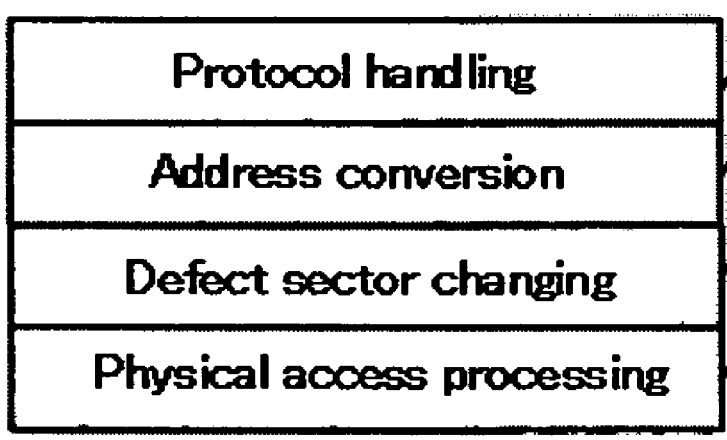
FIG. 2 is a block diagram illustrating software processing layers of a HDD control method according to the prior art.

FIG. 2 is a block diagram illustrating software-processing layers of a HDD control method according to the prior art. In FIG. 2, reference numeral 201 denotes an address conversion layer that converts a LBA specified by a host into a PBA by use of formula manipulation.

Figure 3:
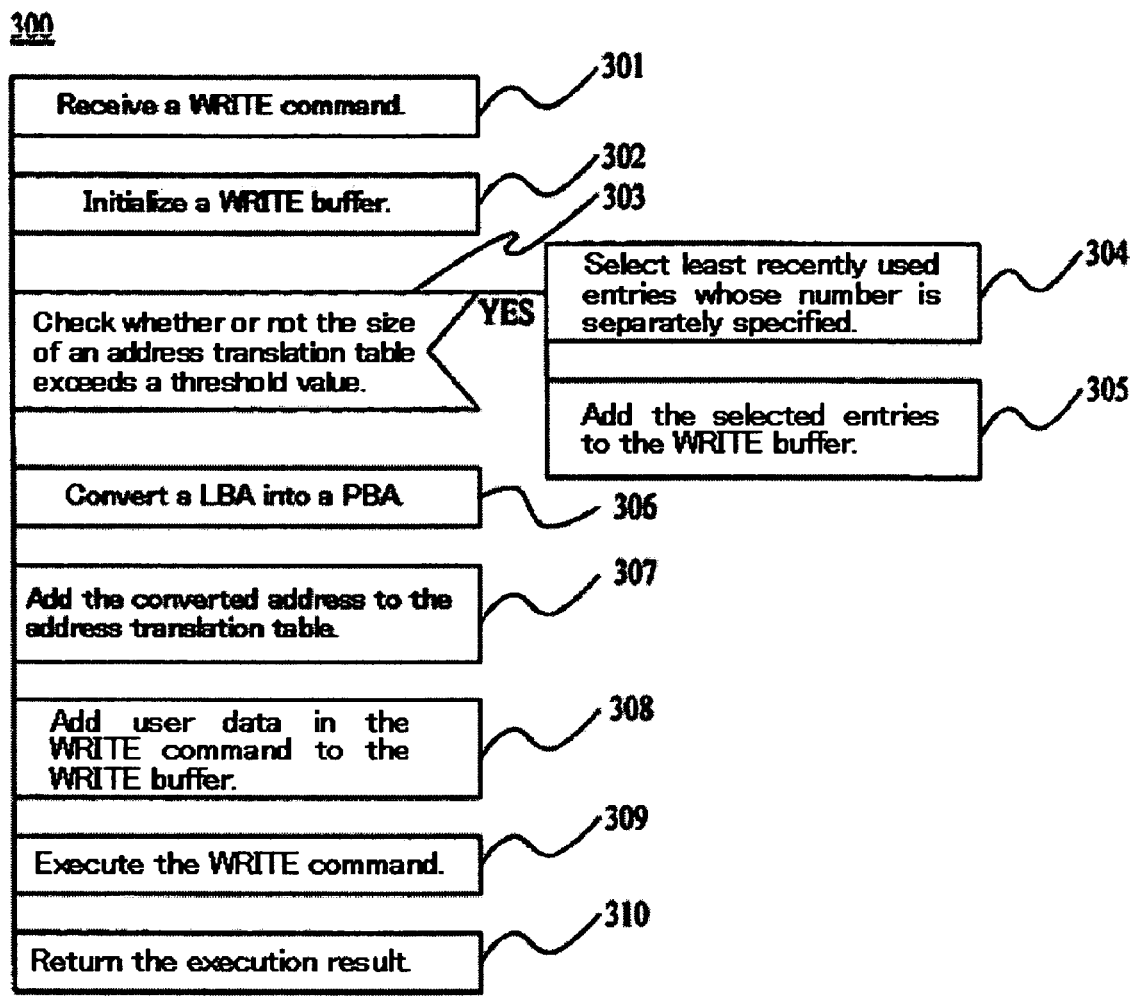
FIG. 3 is a PAD diagram illustrating WRITE processing of the control method for controlling a disk drive according to the first embodiment of the present invention.

FIG. 3 is a PAD diagram 300 illustrating WRITE processing of a method for controlling a disk drive according to the first embodiment of the present invention. Reference numeral 301 denotes a WRITE command receiving step; reference numeral 302 denotes a WRITE buffer initialization step; reference numeral 303 denotes a step for checking whether or not the size of an address translation table in a memory of a HDD exceeds a threshold value that is separately specified; reference numeral 304 denotes a step for selecting least recently used entries, the number of which is separately specified; reference numeral 305 denotes a step for adding the selected entries to a WRITE buffer; reference numeral 306 denotes a step for converting a LBA specified by a host into a PBA in the HDD; reference numeral 307 denotes a step for adding the converted address to the address translation table; reference numeral 308 denotes a step for adding user data in a WRITE command to the WRITE buffer; reference numeral 309 denotes a step for writing contents of the WRITE buffer to a storage medium of the HDD; and reference numeral 310 is a step for returning to the host the execution result of WRITE.

Figure 4:
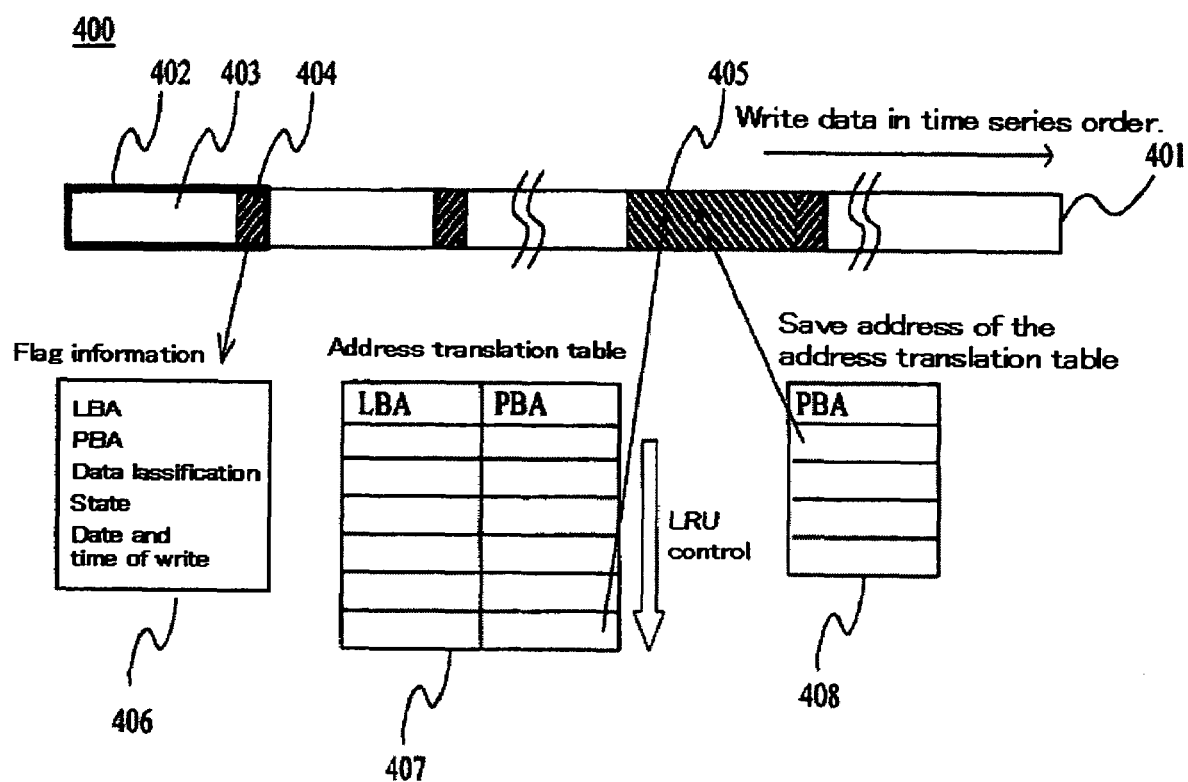
FIG. 4 is a diagram illustrating a data format of the control method for controlling a disk drive according to the first embodiment of the present invention.

FIG. 4 is a diagram illustrating a data format 400 of a method for controlling a disk drive according to the first embodiment of the present invention. In FIG. 4, reference numeral 401 denotes an image of address space on a recording medium of a HDD; reference numeral 402 denotes a unit of each write operation; reference numeral 403 denotes user data; reference numeral 404 denotes a flag; reference numeral 405 denotes saved data of the address translation table which is saved on the recording medium of the HDD; reference numeral 406 denotes a data structure in the flag; reference numeral 407 is an address translation table in a cache memory of the HDD; and reference numeral 408 denotes a physical block address management table in the cache memory of the HDD, which management table manages the address translation table saved on the storage medium of the HDD.

FIG. 5 is a PAD diagram 500 illustrating READ processing of the control method for controlling the disk drive according to the first embodiment of the present invention. Reference numeral 501 denotes a step for receiving a READ command; reference numeral 502 denotes a step for initializing a READ buffer; reference numeral 503 denotes a step for checking whether or not a specified LBA exists in the address translation table in the memory of the HDD; reference numeral 504 denotes a step for reading a PBA from the address translation table in the memory of the HDD; reference numeral 505 denotes a step for reading a PBA from the address translation table saved on the storage medium of the HDD; reference numeral 506 denotes a step for reading from the storage medium of the HDD into the READ buffer; and reference numeral 507 is a step for returning to the host the execution result of READ.

Figures 14, 15:
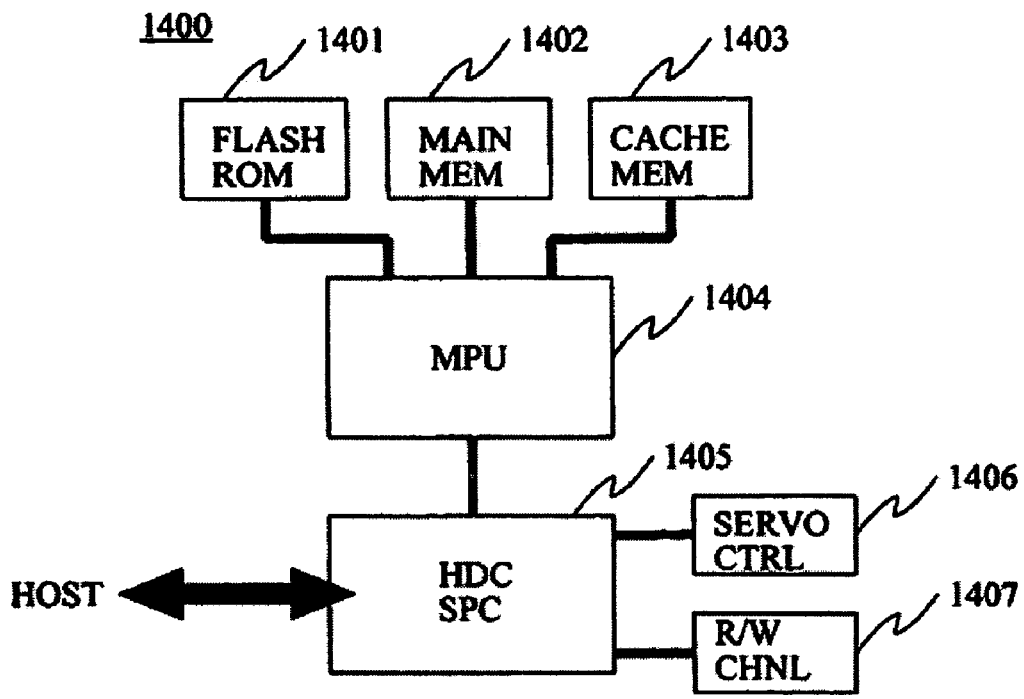
FIG. 14 is a block diagram illustrating hardware of a disk drive according to the first embodiment of the present invention.
FIG. 15 is a diagram illustrating a WRITE (16) command of SCSI.

FIG. 14 is a block diagram illustrating hardware of an appending type HDD according to the first embodiment of the present invention. In FIG. 14, reference numeral 1400 denotes the hardware of the appending type HDD. Reference numeral 1401 denotes a flash ROM; reference numeral 1402 denotes a main memory; reference numeral 1403 denotes a cache memory; reference numeral 1404 denotes a microprocessor (MPU); reference numeral 1405 denotes a hard disk controller (HDC) and a SCSI protocol controller (SPC); reference numeral 1406 denotes a servo controller; and reference numeral 1407 denotes a read/write channel.

FIG. 15 illustrates a WRITE (16) command of SCSI. In FIG. 15, reference numeral 1500 denotes the WRITE (16) command of SCSI; reference numeral 1501 denotes an operation code; reference numeral 1502 denotes a logical block address (LBA); and reference numeral 1503 denotes the transfer length.

FIG. 16 illustrates a READ (16) command of SCSI. In FIG. 16, reference numeral 1600 denotes the READ (16) command of SCSI; reference numeral 1601 denotes an operation code; reference numeral 1602 denotes a logical block address (LBA); and reference numeral 1603 denotes the transfer length.

FIG. 17 is a conceptual diagram illustrating a one-way-linked list. In FIG. 17, reference numeral 1700 denotes the conceptual diagram illustrating the one-way linked list; and reference numeral 1701 denotes a link from a save block of the address translation table this time to a save block of the address translation table last time.

FIG. 18 is a conceptual diagram illustrating a bi-directional-linked list. In FIG. 18, reference numeral 1800 denotes the conceptual diagram illustrating the bi-directional linked list; and reference numeral 1801 denotes a link from a save block of the address translation table last time to a save block of the address translation table this time.

This embodiment is characterized in that a physical block address (PBA) of a recording medium is assigned so that irrespective of a value of a logical block address (LBA) specified by a host, data is appended at the end of existing data on the recording medium of the HDD, and thus a HDD is controlled.

The software processing layers of the HDD according to the prior art shown in FIG. 2 are roughly classified into four parts: the protocol handling layer 101, the address conversion layer 201, the defect sector changing layer 103, and the physical access processing layer 104. The protocol handling layer 101 interprets commands such as commands of ATA and SCSI, which are protocols used when the host communicates with the HDD, and then translates the interpreted commands into control commands used in the HDD. The address conversion layer 201 performs formula manipulation of a LBA specified by the host so as to convert the LBA into a PBA. If a sector specified by the PBA obtained as a result of the conversion by the address conversion layer 201 is a defect sector, the defect sector changing layer 103 changes the PBA to that of a normal sector that serves as a substitute. The physical access processing layer 104 performs read and write to the sector specified by the PBA.

As opposed to this, the software processing layers of the HDD according to this embodiment is characterized in that, as shown in FIG. 1, the LBA is converted into the PBA using the log conversion layer 102 instead of the address conversion layer 201 unlike the prior art. In the log conversion layer 102, the LBA is converted so that the end of existing data is accessed in an appending manner on the storage medium of the HDD. Thus, the address conversion is achieved by the log conversion layer 102 instead of the address conversion layer 201, and accordingly existing programs can be used for the protocol handling layer 101 and the defect sector changing layer 103. This leads to a reduction in man-hour required for the development of programs.

FIG. 14 is a block diagram illustrating operation of the appending type HDD according to the first embodiment of the present invention. A control program of the appending type HDD is stored in the flash ROM 1401. When the MPU 1404 is powered on, the MPU 1404 reads out the control program from the flash ROM 1401, and then loads the control program into the main memory 1402. This control program includes the READ processing in FIG. 3 and the WRITE processing in FIG. 5.

The HDC/SPC 1405 receives a command from the host, and transmits a response to the host. The command is the WRITE (16) command in FIG. 15, the READ (16) commands in FIG. 16, or the like. The SPC transmits and receives a command and data in the SCSI protocol. The processing in the SPC corresponds to the following: in the WRITE processing shown in FIG. 3, the WRITE command receiving step 301, and the step 310 for returning to the host the execution result of the WRITE command; and in the READ processing shown in FIG. 5, the READ command receiving step 501, and the step 507 for returning to the host the execution result of the READ command.

Upon completion of the processing in the SPC, the processing is shifted to the MPU 1404. The MPU 1404 performs processing required to access the recording medium of the HDD according to the control program in the main memory 1402. The processing in the MPU 1404 corresponds to the following: in the WRITE processing in FIG. 3, the steps 302 through 308; and in the READ processing in FIG. 5, the steps 502 through 505.

WRITE data received from the host and READ data read out from the recording medium of the HDD are saved in the cache memory 1403. In addition, the address translation table 407 and the address translation table save address 408, shown in FIG. 4, are also saved in the cache memory 1403.

Various kinds of variables required for the processing in the MPU 1404 are also saved in the main memory 1402. The variables include: a separately specified threshold value (used in the step 303) used to determine the size of the address translation table; and a variable (used in the step 306) for managing a PBA up to which write has been completed.

Upon completion of the processing in the MPU 1404, the processing is shifted to the HDC. According to the physical block address converted in the MPU 1404, the HDC transmits the command to the servo controller 1406 to control the head of the HDD. After controlling the head, the HDC transmits the command to the read/write channel 1407 to perform data WRITE to or data READ from the recording medium. The processing in the HDC corresponds to the following: in the WRITE processing in FIG. 3, the step 309 for writing contents of the WRITE buffer to the HDD; and in the READ processing in FIG. 5, the step for reading from the recording medium of the HDD into the READ buffer.

A structure of each SCSI command will be described with reference to FIGS. 15 and 16. A first byte of each command is an operation code. As an operation code 1501 of a WRITE command, 8Ah is stored; and as an operation code 1601 of a READ command, 88h is stored. In an area from a second byte to a ninth byte, a logical block address (LBA) 1502 or 1602 is stored. The LBA 1502 is converted into a physical block address (PBA) in the step 306. The LBA 1602 is converted into a PBA in the steps 503 through 505. In an area from a tenth byte to a thirteenth byte, a transfer length 1503 or 1603 is stored. In the step 302, the size of the WRITE buffer is determined by the transfer length 1503, and then initialization is performed. In the step 308, user data received in the step 301, the size of which is equivalent to the transfer length 1503, is transferred to the WRITE buffer. In the step 502, the READ buffer is initialized so as to have the size equivalent to the transfer length 1603. In the step 506, data read from the recording medium, the size of which is equivalent to the transfer length 1603, is stored in the READ buffer.

Next, steps of a WRITE command will be described with reference to FIG. 3. A required data structure will be described also with reference to FIG. 4. In FIG. 3, the steps 303 through 307 correspond to the log conversion layer 102.

In the step 301, the WRITE command is received from the host. In the step 302, the WRITE buffer is initialized, before proceeding to the step 303.

The conversion from the LBA into the PBA in this embodiment is not achieved by formula manipulation but by assigning the next address of the last assigned address. The conversion is therefore based on an internal state of the HDD. For this reason, it is necessary to manage the correspondence between the LBA and the PBA by use of the address translation table. In order to speed up the processing, it is desirable to store the address translation table in a medium, such as a semiconductor memory, which can be accessed at high speed. However, because the size of the address translation table covering all LBAs that can be specified is very large, the address translation table cannot be stored in a semiconductor memory with which the HDD can be equipped. For this reason, in this embodiment, the address translation table 407 including entries of LBA and PBA as shown in FIG. 4 is built in a cache memory formed of a semiconductor memory, and thereby only frequently used LBAs are managed by the LRU control. Entries which could not be stored in the address translation table 407 are saved on the storage medium.

In the step 303, a check is made as to whether or not the number of entries representing the correspondence between LBA and PBA that are written in the address translation table 407 exceeds a threshold value that is separately specified. If the number of entries exceeds the threshold value, the process proceeds to the step 304. If the number of entries does not exceed the threshold value, the process proceeds to the step 306. In the step 304, entries whose number is separately specified are selected by the LRU method; to be more specific, entries that are least recently used are selected. It is desirable that the entries stored in the address translation table 407 be saved on the storage medium of the HDD at least once. Accordingly, in addition to saving less frequently used entries by the LRU method to delete the entries from the address translation table 407, each entry is provided with a flag for managing whether or not this entry is saved on the storage medium. The address translation table 407 is therefore controlled so that so long as the WRITE buffer has a free area, entries that are frequently used but are not saved are saved. After the step 304 ends, the process proceeds to the step 305.

In the step 305, in the same manner as that in the step 306 described below, a block for saving the address translation table 407 is allocated, and then a PBA value of the save block, and an entry selected in the step 305, are added to the WRITE buffer. In addition, the PBA value of the save block is stored in a table 408 for the managing save address of the address translation table. The table 408 is provided in the cache memory of the HDD. Moreover, at least a PBA at which the address translation table 407 has been saved last is read out from the management table 408, and then the PBA is added to the WRITE buffer. Thus, storing the PBAs at which the address translation table has been saved allows all saved data to be linked by a linked list. It is therefore possible to easily search for saved data without scamming all data on the basis of data classification of the flag 404. After the step 305 ends, the process proceeds to the step 306.

Here, the saved data are linked to one another by the one-way linked list. However, linking the saved data by a bi-directional linked list makes it possible to perform the search more efficiently and more flexibly.

FIG. 17 is a conceptual diagram illustrating the one-way linked list. As shown in a link 1701, when the address translation table is saved this time, saving not only the address translation table but also the PBA value at which the address translation table has been saved last time makes it possible to trace, from the present to the past, the PBAs at which the address translation table has been saved.

FIG. 18 is a conceptual diagram illustrating the bi-directional linked list. In addition to the one-way linked list shown in FIG. 17, as shown in a link 1801, appending a PBA value at which the address translation table is saved this time to a PBA at which the address translation table has been saved last time makes it possible to trace, from the past to the present, the PBAs at which the address translation table has been saved. Using both the link 1701 and the link 1801 allows the address translation table to be traced in both directions, that is, from the past to the present or vice versa.

In the step 306, a LBA specified by the host using a WRITE command is converted into a PBA to be used when actually writing to a storage medium of the HDD. The data is appended to the end of existing data. Therefore, on a work memory of the HDD, there is a variable for managing a PBA up to which write has been completed. A value is read from the variable, and the PBA is determined so that write is successively performed from an address following the address. The variable used for the write management, which is stored in the work memory, is saved in a nonvolatile management area of the HDD at the time of retracting the head, or power off. At the time of power on or the like, the value saved in the nonvolatile management area is read out, and then the variable of the write management on the work memory is initialized. After the step 306 ends, the process proceeds to the step 307.

In the step 307, the correspondence between the LBA specified by the host and the PBA determined in the step 306 is stored as one entry in the address translation table 407 in the cache memory. After the step 307 ends, the process proceeds to the step 308.

In the step 308, the PBA converted in the step 306 and user data specified by the host using the WRITE command are added to the WRITE buffer. After the step 308 ends, the process proceeds to the step 309.

In the step 309, on the basis of the combination of the PBA and the data that have been written to the WRITE buffer, the data is written to the storage medium. After the step 309 ends, the process proceeds to the step 310.

In the step 310, the result of writing to the recording medium is returned to the host as a response of the WRITE command.

Examples of methods for specifying a threshold value and the number of entries to be saved that are used in the steps 303 and 304 include: a method of creating a new entry as a management entry of S.M.A.R.T., and then specifying them through the entry; a method of defining a new command as a vendor definition command, and then specifying them by use of the command; and a method of encapsulating a management command in a data area of a usual WRITE command, and then specifying them.

In the method that uses the usual WRITE command, the management command is identified by performing WRITE at a LBA outside the usable range with usual access. Examples of methods of determining the LBA that is to be used at this time include a method of using a value obtained by encoding an ID specific to the HDD, and a method of using a value obtained by encoding an ID specific to the HDD and an ID of a management command to be executed. In the case of a management command that requires a plurality of sequences before the execution, it is possible to prevent the command from being executed mistakenly by such control that a LBA to be accessed is changed in succession according to a certain fixed rule. In addition, by encrypting a management command encapsulated in a data area of a WRITE command, it is possible to reduce the risk of the issuance of a management command by an illegal means such as a virus.

According to this embodiment, irrespective of a LBA value specified by the host, writing to a storage medium of the HDD in an appending manner becomes possible, which reduces seek time of the head, thereby producing an effect of improving WRITE performance.

Further, according to this embodiment, even if the capacity of a cache memory is so small that the whole address translation table cannot be saved in the cache memory, there is an effect of being able to efficiently search for a PBA corresponding to a LBA.

Next, a data format on a recording medium will be described with reference to FIG. 4. Reference numeral 401 denotes an image of address space on a recording medium of the HDD. When user data is written to a usual HDD, with the exception of an ECC code used for verification, only user data is basically written. As opposed to this, in the method for controlling a disk drive according to this embodiment, a flag 404 as well as user data 403 is written.

A unit of writing once to the recording medium of the HDD is equivalent to an area 402 formed of the user data 403 (or the saved data 405) and the flag 404.

Reference numeral 406 denotes a data structure of the flag 404. A LBA is an address specified by the host; and a PBA is an address converted in the step 306. A data classification is an identifier for identifying the user data 403 which the host has instructed to write, or the saved data 405 of the address translation table. A state is used when a state of the user data 403 or that of the saved data 405 is managed at the time of reusing an area. The reuse will be described in another embodiment. Date and time of write is date and time when the user data 403 or the saved data 405 has been written to a storage medium of the HDD. If the date and time of write can be used for the verification of integrity of the user data 403, and the like, this date and time of write is not necessarily required to be date and time synchronized with the outside, and what is more, a sequence number which increments at each write, or the like, also suffices. For example, if time is used, there is a technique in which the total length of operating time of the HDD is used. The total length of operating time is calculated by use of a timer counting up the length of time from the first operation of the HDD. At the time of retraction of the head or power off, the total length of operating time is saved in the nonvolatile management area of the HDD. If the value of the timer saved in the nonvolatile management area is read out at the time of power on, or the like, to initialize the timer, a backup battery for the timer becomes unnecessary.

In this embodiment, as is the case with the user data 403, the address translation table is appended in the form the saved data 405 on the storage medium of the HDD every time the address translation table 407 overflows. However, other methods may also be used. For example, there is a method in which an address translation table covering all LBAs that can be specified is saved on the storage medium of the HDD. Examples of areas for storing the address translation table at this time include a nonvolatile management area and a user data space of the HDD. With the object of achieving the security of data, it is desirable to duplicate the data. In this case, the following two methods may be used in combination. One is that the saved data 405 is appended on the storage medium of the HDD. The other is that the address translation table covering all LBAs that can be specified is saved on the storage medium of the HDD.

In this embodiment, the flag 404 is allocated immediately after the user data 403 or immediately after the saved data 405 of the address translation table. However, this embodiment can be achieved in like manner also in other allocation methods. Examples of other allocation methods include a method of allocating the flag 404 before the user data 403 or the saved data 405, and a method of allocating the flag 404 in the management area of the HDD.

In this embodiment, a PBA of a block is included in the data structure 406 of the flag. This is a measure taken for convenience of debugging, and the like. Therefore, it is not always necessary to include the PBA in the data structure 406 of the flag.

For the purpose of data verification and debugging in the HDD, it is necessary to directly refer to the data structure in the HDD as shown in FIG. 4, more specifically, all of the user data 403, the flag 404, and the saved data 405, or only the flag 404. In this case, as is the case with specifying a threshold value and the number of entries to be saved, there is a method in which a management command is specified by encapsulating the management command in a data area for S.M.A.R.T., a vendor definition command, and a usual WRITE command. Another method is, in the case of SCSI, for example an accessing method that uses a LUN different from a usual HDD volume. If the data structure in the HDD is accessed by these techniques, the address translation table 407 is not used to convert a LBA specified by the host into a PBA. Instead of it, this internal data structure is accessed directly using the LBA as the PBA or by converting the LBA into the PBA by numerical formula conversion.

Next, steps of a READ command will be described with reference to FIG. 5. In FIG. 5, the steps 503 through 505 correspond to the log conversion layer 102.

In the step 501, the READ command is received from the host. In the step 502, the READ buffer is initialized. After the step 502 ends, the process proceeds to the step 503.

In the step 503, a check is made as to whether or not a LBA entry specified by the host exists in the address translation table 407. If the LBA entry exists, a PBA corresponding to the LBA specified by the host is read out in the step 504. If the LBA entry does not exist, in the step 505, a PBA corresponding to the LBA specified by the host is read out from the address translation table 405 saved in a storage medium of the HDD. As described in the step 305, when the address translation table is saved, if a PBA value of a block that has been saved last time is also saved, all saved data are linked to one another by a linked list. This allows all saved blocks to be searched for in sequence. As a result, even if the capacity of the management table 408 for managing PBAs of the address translation table is so small that all PBA values of saved blocks cannot be held, it is possible to easily search for saved data without scanning all data on the basis of data classification included in the flag 404. After the step 504 or 505 ends, the process proceeds to the step 506.

In the step 506, with reference to the PBA read out, data is read into the READ buffer. After the step 506 ends, the process proceeds to the step 507. In the step 507, contents of the READ buffer are returned to the host as a response to the READ command.

In this embodiment, although the control method of a single HDD is described as above, the present invention can be applied in like manner also to a large-scale disk array device equipped with a powerful processor and a large capacity memory.

FIG. 6 is a diagram illustrating a data format of a method for controlling a disk drive according to a second embodiment of the present invention. In FIG. 6, reference numeral 600 denotes a data format according to the second embodiment of the present invention; reference numeral 601 denotes a flag; reference numeral 602 denotes a unit of each write operation; and reference numeral 603 denotes a data structure in the flag.

This embodiment is characterized by such optimization of write operation that data is written at consecutive addresses. Consequently, it is possible to reduce the data area required for the flag unlike the first embodiment.

One flag 404 is assigned to a piece of user data 403 in the first embodiment, whereas one flag 601 is assigned to two or more pieces of user data 403 in this embodiment. When a HDD is accessed in a unit of 4 kB in a file system or the like, if the size of one block is 512 B, an area required for a flag can be reduced to ⅛.

In order to realize such control, as shown in a data structure 603 of the flag, a plurality of LBAs which are consecutive addresses are encoded by an offset of LBA and the number of blocks.

A unit of data write 602 has one flag 601 and two or more pieces of user data 403. The number of blocks in the data structure 603 of the flag manages the number of blocks to be successively written; therefore, the number of user data 403 written at a time is variable. In addition, the number of times the flag 601 is written is reduced, which produces an effect of improving the WRITE performance.

According to this embodiment, an effect of reducing a data area required for the flag is produced. In addition to it, since the number of times the flag is written is reduced, an effect of improving the WRITE performance is produced.

Figure 7:
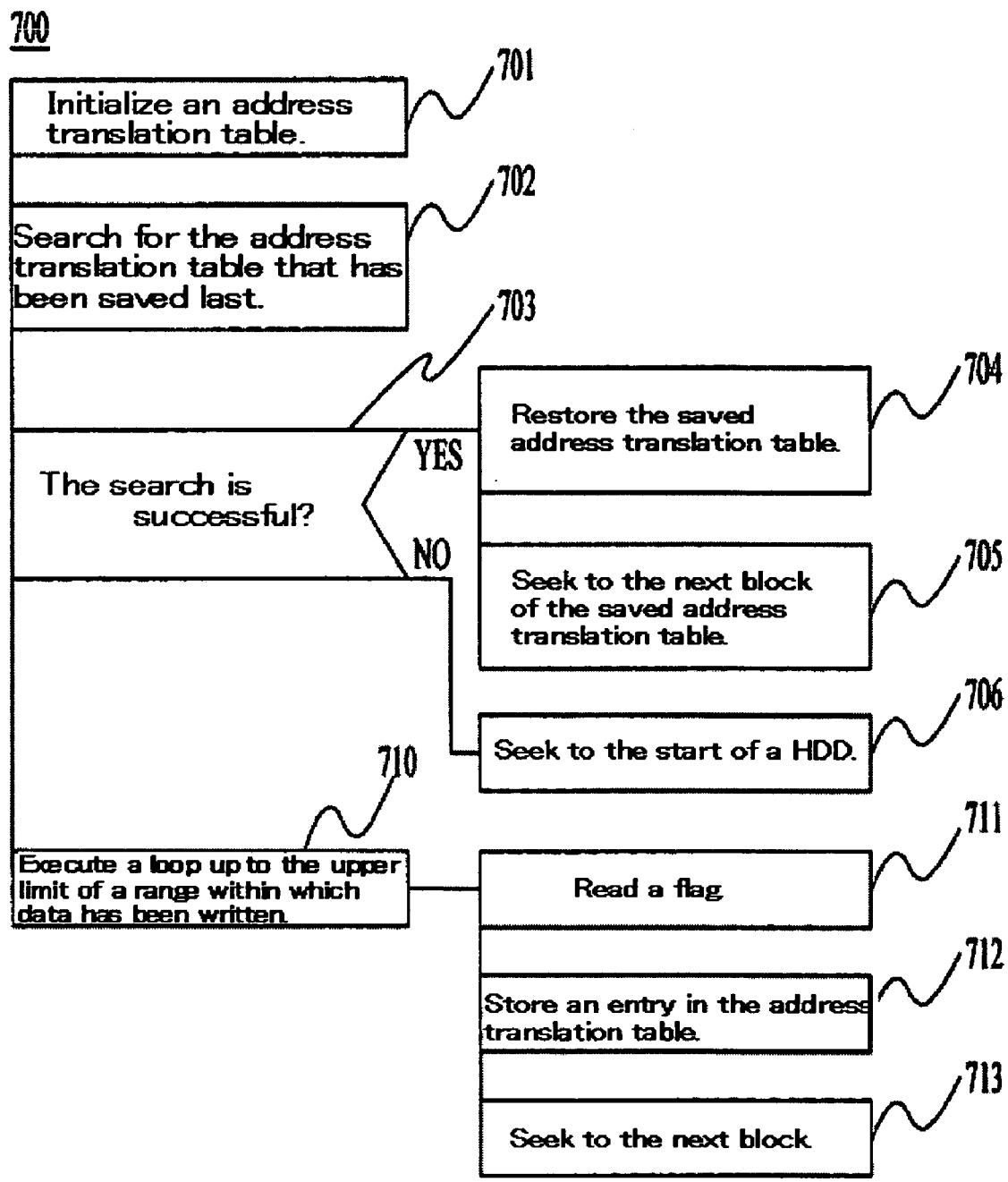
FIG. 7 is a PAD diagram illustrating a failure recovery method of an address translation table included in a method for controlling a disk drive according to a third embodiment of the present invention.

FIG. 7 is a PAD diagram 700 illustrating a failure recovery method of an address translation table included in a method for controlling a disk drive according to a third embodiment of the present invention. Reference numeral 701 denotes an initialization step for initializing the address translation table; reference numeral 702 is a search step for searching the address translation table that has been saved last; reference numeral 703 denotes a step for judging whether or not the search has succeeded; reference numeral 704 denotes a step for restoring the address translation table 407 in a cache memory by use of the saved data 405 that has been saved in a HDD; reference numeral 705 denotes a step for seeking to the next block of the saved data; reference numeral 706 denotes a step for seeking to the start of the HDD; reference numeral 710 denotes a step for executing a loop up to the upper limit of a PBA range within which data has been written to the HDD; reference numeral 711 denotes a step for reading the flag 404; reference numeral 712 denotes a step for reading a LBA and a PBA from the data structure 406 of the flag to create an entry, and then for storing the entry in the address translation table 407; and reference numeral 713 denotes a step for seeking to the next block of a block that is currently being handled.

If the HDD is powered off, contents of the address translation table 407 in the cache memory described in the first embodiment are lost. Because of it, the following steps are required: at the time of retraction of the head, or power off, saving the address translation table 407 in the nonvolatile management area of the HDD; and at the time of powering on the HDD, reading out the saved address translation table from the management area, and restoring the address translation table 407 in the cache memory by use of the read address translation table. However, if the address translation table 407 cannot be saved due to sudden power shutdown, runaway of the host or of the HDD system, or the like, it is necessary to rebuild an address translation table on the basis of information written on the storage medium of the HDD. This embodiment is characterized by the rebuilding of the address translation table in the cache memory by use of the address translation table that has been saved last time in the storage medium of the HDD, and by use of flag information of user data obtained after the address translation table has been saved.

In the step 701, the address translation table 407 in the cache memory is initialized. After the step 701 ends, the process proceeds to the step 702.

In the step 702, the address translation table that has been saved last time on the storage medium of the HDD is searched for. An example of a search technique will be described below.

(1) A PBA value at which a write has been made last is read out from the management area of the HDD, before seek is performed on the PBA.

(2) Seek is performed in a direction in which a PBA value becomes large, and thereby the flag 404 of a block is read out to check whether or not the block is unused.

(3) Item (2) is repeated to find out a PBA of the block that has been written to the HDD last. The PBA of the block that has been written last is assumed to be a LPBA.

(4) By the number of entries (N ENTRY) that can be stored in the address translation table 407, seek is performed in a direction in which a PBA value becomes small. The PBA on which seek has been performed is assumed to be a SPBA.

(5) The flag 404 of a block is read out to check whether or not the block is the saved data 405.

(6) If the block is the saved data 405, the processing ends. If the block is not the saved data 405, seek is performed in a direction in which a PBA value becomes large, before returning to the processing of (5). If the saved data is not found as a result of seeking up to the LPBA, seek is performed from the SPBA in a direction in which a PBA value becomes small, further by the number of entries (N ENTRY), and then the processing of (5) is repeated.

After the step 702 ends, the process proceeds to the step 703. In the step 703, a condition judgment is made as to whether or not the saved data 405 has been found. If the saved data 405 is found, the process proceeds to the step 704. If the saved data 405 is not found, the process proceeds to the step 706.

In the step 704, the found saved data 405 that has been saved on the HDD is restored as the address translation table 407 in the cache memory. Then, the process proceeds to the step 705.

In the step 705, seek is performed on the next block of the saved data 405. Next, the process proceeds to the step 710.

In the step 706, seek is performed on a PBA of the top of the HDD. If the saved data 405 is not saved on the storage medium, it is necessary to read all block flags from the top of the storage medium, and thereby to rebuild the address translation table. Next, the process proceeds to the step 710.

In the processing thereafter, the address translation table 407 is rebuilt for the user data 403 written after the saved data 405 has been written.

The step 710 is a loop in which the steps 711 through 713 are repeatedly executed until the LPBA is reached.

In the step 711, the flag 404 of a block is read. Next, the process proceeds to the step 712.

In the step 712, a LBA and a PBA of the read flag 404 are combined into an entry, and the entry is then stored in the address translation table 407. Next, the process proceeds to the step 713.

In the step 713, seek is performed on the next block.

According to this embodiment, the saved data of the address translation table and a flag of the block that is equivalent to a difference from the saved data are read out to rebuild the address translation table. This produces an effect of rebuilding the address translation table at high speed.

Figure 8:
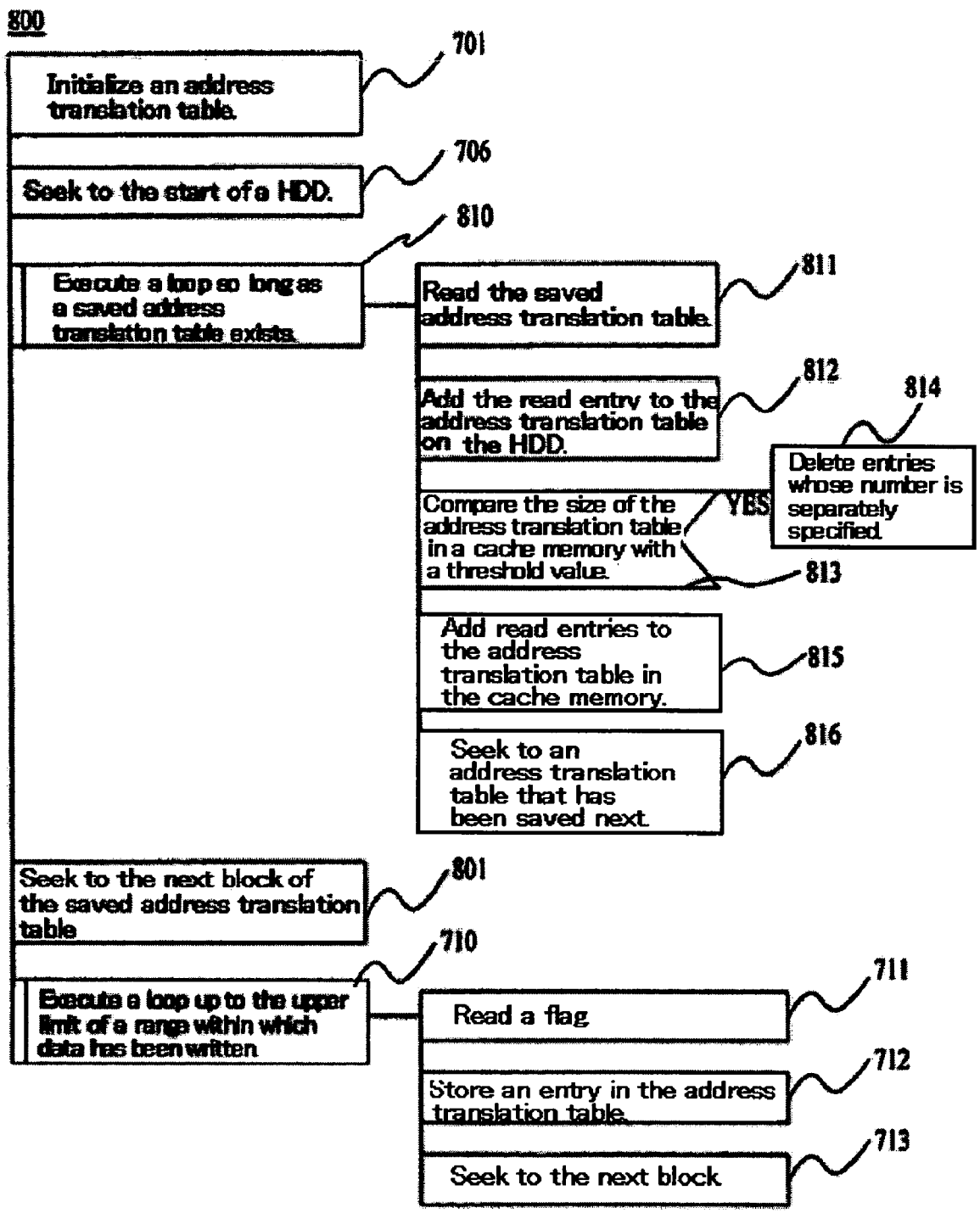
FIG. 8 is a PAD diagram illustrating a failure recovery method of an address translation table included in a method for controlling a disk drive according to a fourth embodiment of the present invention.

FIG. 8 is a PAD diagram 800 illustrating a failure recovery method of an address translation table included in a method for controlling a disk drive according to a fourth embodiment of the present invention. Reference numeral 801 denotes a step for seeking to the next block of the saved address translation table; reference numeral 810 is a step for repeating a loop so long as the saved address translation table exists; reference numeral 811 denotes a step for reading the saved data 405, which is the address translation table that has been saved on the HDD; reference numeral 812 denotes a step for adding the read saved data 405 to the address translation table covering all LBAs that can be specified on the storage medium of the HDD; reference numeral 813 denotes a step for checking whether or not the number of entries of the address translation table 407 in the cache memory exceeds a threshold value separately specified; reference numeral 814 denotes a step for deleting entries from the address translation table 407 by the number of entries separately specified, if the number of entries exceeds the threshold value; reference numeral 815 denotes a step for adding the read saved data 405 to the address translation table 407 in the cache memory; and reference numeral 816 denotes a step for seeking to saved data that has been saved subsequent to the saved data 405 that is currently read.

This embodiment of the present invention is characterized by rebuilding the address translation table from all saved data 405 saved on the storage medium of the HDD. This method is particularly useful for a case where a complete address translation table that stores PBAs corresponding to all LBAs that can be specified by the host must be built at high speed on a storage medium of the HDD, more specifically, in the user data space, the management area, or the like.

What is described in the first embodiment is the case where a one-way linked list of the saved data 405 is made by including, in the saved data 405, the PBA value at which the saved data 405 has been saved last time. In this one-way linked list, the saved data 405 is traced in order of decreasing PBA. Accordingly, the saved data 405 that has been written in time series order is traced in reverse order. Because reading the saved data in time series order can simplify an algorithm for storing in the address translation table, it is desirable to use a bi-directional linked list by which the saved data 405 can be traced also in time series order.

The one-way linked list can be changed to the bi-directional linked list by the following steps:

(1) reading the saved data 405 that has been saved last;
(2) storing a PBA of the saved data 405;
(3) reading, from the read saved data 405, a PBA value of the saved data 405 that has been saved last time;
(4) reading the saved data 405 that has been saved last time;

(5) obtaining a PBA value of the saved data 405 that is stored in the read saved data 405, and then writing the PBA back to the storage medium of the HDD; and (6) returning to item (2) so long as the saved data 405 that has been read last time is present.

In the step 701, the address translation table 407 in the cache memory is initialized, and then the process proceeds to the step 706. In the step 706, seek is performed to the top of the storage medium of the HDD, and then the process proceeds to the step 810.

In the step 810, so long as the saved data 405 that has been saved on the storage medium of the HDD is present, a loop from the step 811 to the step 816 is executed. In this loop, the saved data 405 is referred to in order of writing to the storage medium of the HDD. If the saved data 405 forms a one-way linked list that traces the saved data 405 in reverse time series order, the one-way linked list is changed to a bi-directional linked list by the steps described above before execution of the loop.

In the step 811, the address translation table and the saved data 405 saved on the storage medium of the HDD are read, before the process proceeds to the step 812.

In the step 812, an entry from the read saved data is added to the complete address translation table that stores PBAs corresponding to all LBAs that can be specified by the host, and then the process proceeds to the step 813.

In the step 813, a comparison is made to check whether or not the number of entries stored in the address translation table 407 in the cache memory exceed a threshold value separately specified. If the number of entries exceeds the threshold value, the process proceeds to the step 814. After the step 814 ends, or if the number of entries does not exceed the threshold value, the process proceeds to the step 815.

In the step 814, entries whose number is separately specified are deleted from the address translation table 407 by use of the LRU method.

In the step 815, the read saved data 405 is stored in the address translation table 407, before the process proceeds to the step 816.

In the step 816, using a bi-directional linked list included in the saved data 405, a link is traced in a forward direction in which a PBA value becomes large, and then the saved data 405, which has been saved subsequent to the saved data 405 currently read, is read.

After all saved data 405 has been read in the loop of the step 810, the address translation table is restored from the user data 403 that is not included in the saved data 405.

In the step 801, seek is performed to the next block of the saved data 405, and then the process proceeds to the step 710. After the step 710, as is the case with the steps after the step 710 in the third embodiment, the address translation table is restored from the user data 403.

According to this embodiment, by linking the saved data 405 to a list beforehand, and then reading only the saved data 405, it becomes possible to read out only target saved data 405 without scanning all blocks. This produces an effect of rebuilding the address translation table at higher speed than scanning all blocks.

Although the entries are deleted in the step 814, they can be saved in the storage medium as described in FIG. 3. In this case, with the object of allocating a save area in advance on the storage medium, it is desirable to perform the address conversion from a LBA to a PBA so that an unused area is periodically provided on the PBA address space.

Figure 9:
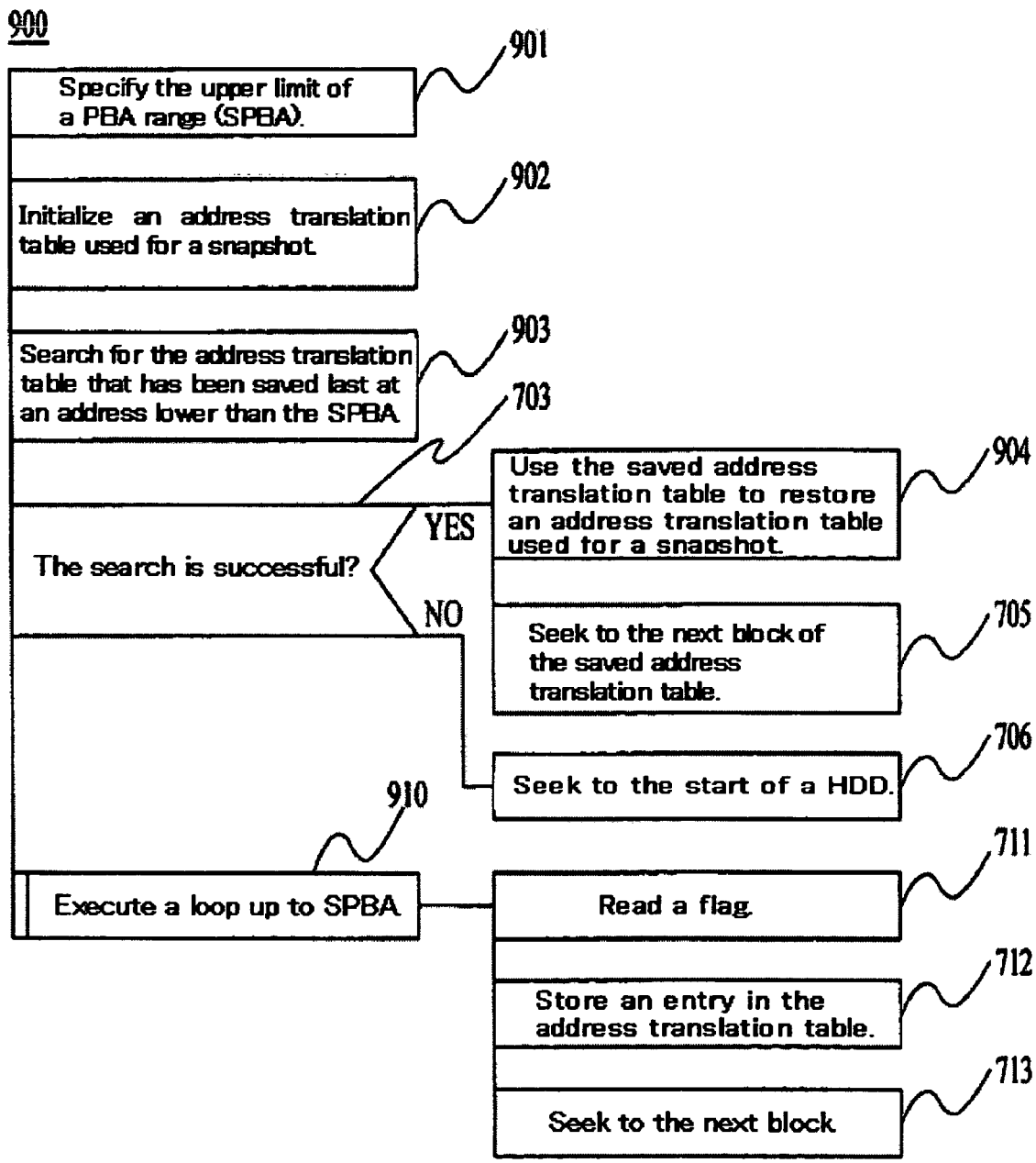
FIG. 9 is a PAD diagram illustrating a snapshot building method included in a method for controlling a disk drive according to a fifth embodiment of the present invention.

FIG. 9 is a PAD diagram 900 illustrating a snapshot building method included in a method for controlling a disk drive according to a fifth embodiment of the present invention. Reference numeral 901 denotes a step for specifying a SPBA that is the upper limit of a PBA range for building a snapshot; reference numeral 902 denotes an initialization step for initializing an address translation table used for a snapshot; reference numeral 903 denotes a step for searching the cache memory for the saved data 405 of the address translation table 407 which has been saved last at an address lower than the SPBA; reference numeral 904 denotes a step for restoring an address translation table use for a snapshot by used of the saved data 405; and reference numeral 910 is a step for repeating a loop until the SPBA is reached.

This embodiment is characterized by a snapshot realized by rebuilding an address translation table in such a manner that the upper limit is put on PBAs to be handled.

All writes to the storage medium of the HDD are performed in time series order. Therefore, building an address translation table within a separately specified PBA range makes it possible to obtain a snapshot that is an image of the HDD at a certain point of time in the past. To be more specific, if a step for specifying the upper limit PBA used when building a snapshot is added to the failure recovery method of the address translation table as described in the third embodiment, steps for building a snapshot are provided.

In the step 901, the SPBA that is the upper limit PBA used when a snapshot is built is specified. Then, the process proceeds to the step 902.

In the step 902, the address translation table for a snapshot in the cache memory is initialized, and then the process proceeds to the step 903. To make it possible to access a snapshot while a usual access to the HDD is allowed, an address translation table used for the snapshot is separately prepared independently of the address translation table 407 used for a usual access. In order to enable the host to access both a usual HDD volume and a snapshot volume at the same time, it is necessary to provide each volume with an access path. For example, if an access is made by use of the SCSI protocol, a method is provided in which a LUN assigned to the usual HDD volume differs from that assigned to the snapshot volume.

Processing performed after the step 903 is similar to the processing after the step 702 shown in FIG. 7 with the exception that the LPBA is replaced with the SPBA.

In order to obtain a snapshot at the point of time when a user wishes, it is desirable to recognize the date and time at which a write has been made to the HDD as the date and time of the host. For this purpose, a technique is provided in which the date and time when the host has issued the write command is included in a write command from the host, and the command issuance date and time is added to the data structure 406 of the flag 404 of a block.

According to this embodiment, there is produced an effect of building a snapshot that can access a volume while a usual access to the volume of the HDD is allowed. In addition to it, the saved data of the address translation table and a flag of the block that is equivalent to a difference from the saved data are read out to rebuild the address translation table. This produces an effect of building a snapshot at high speed.

Figure 10:
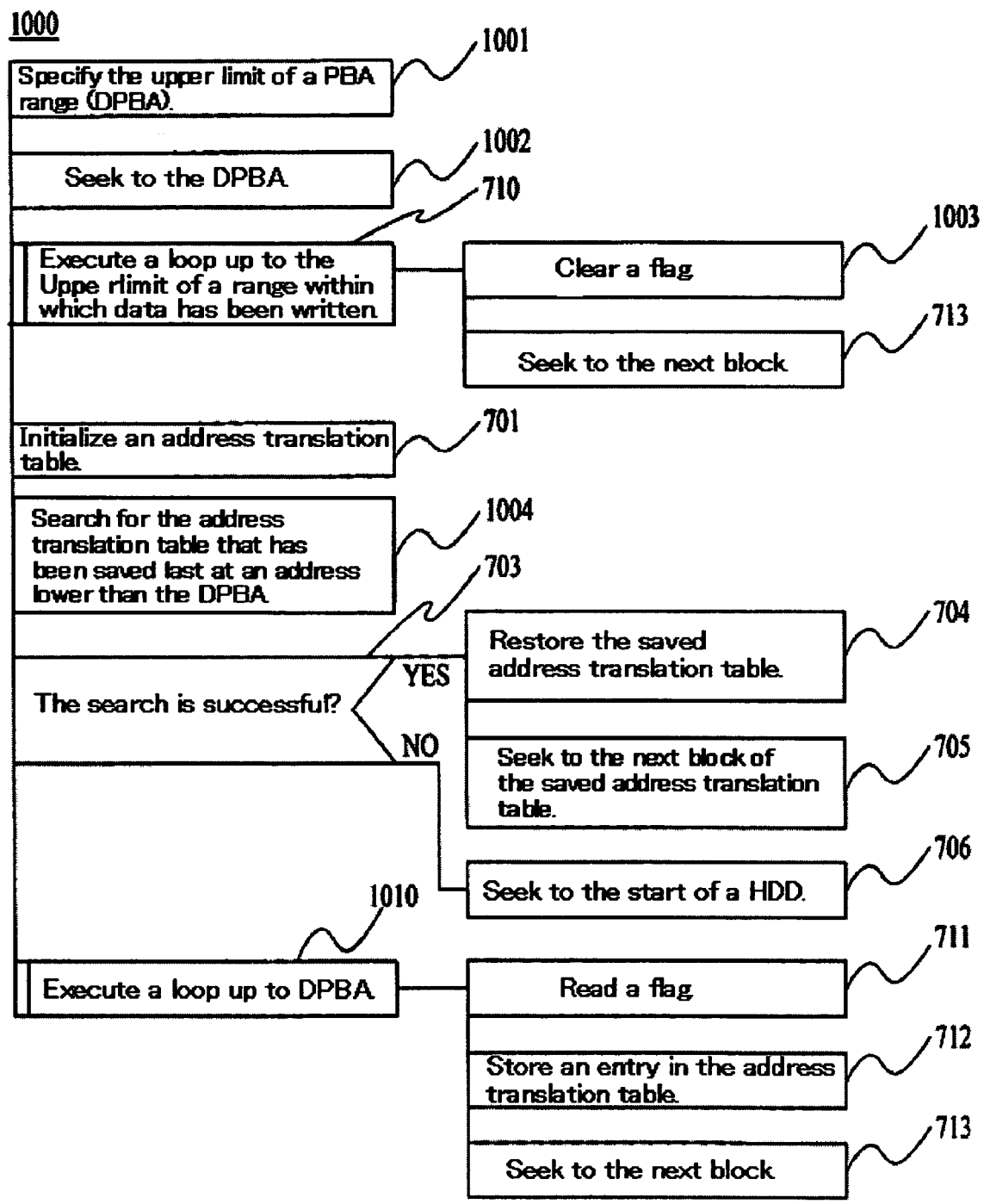
FIG. 10 is a PAD diagram illustrating a WRITE disabling method included in a method for controlling a disk drive according to a sixth embodiment of the present invention.

FIG. 10 is a PAD diagram 1000 illustrating a WRITE disabling method included in a method for controlling a disk drive according to a sixth embodiment of the present invention. Reference numeral 1001 denotes a step for specifying a DPBA which is the upper limit of a PBA range within which data is left on the storage medium of the HDD (the lower limit of the PBA range from which erase is started); reference numeral 1002 denotes a step for seeking to the DPBA; reference numeral 1003 denotes a step for clearing the flag 404; reference numeral 1004 denotes a step for searching the cache memory for the saved data 405 of the address translation table 407 that has been saved last at an address lower than that of the DPBA; and reference numeral 1010 denotes a step for repeating a loop until the DPBA is reached.

This embodiment is characterized by disabling write at a physical block address higher than or equal to a certain PBA, rebuilding an address translation table at a physical block address lower than the certain PBA, and thereby erasing data that has been written to the storage medium of the HDD after a certain point of time so as to roll back to a former state of the storage medium of the HDD.

All writes to the storage medium of the HDD are performed in time series order. Therefore, write is disabled at a physical block address higher than or equal to a separately specified PBA, and then an address translation table is rebuild at a physical block address lower than the separately specified PBA. This makes it possible to disable write to the storage medium of the HDD at an arbitrary point of time, and thereby to roll back to a former state. To be more specific, if a step for specifying a PBA from which disabling of WRITE is started and a step for disabling write at the specified PBA or higher are added to the failure recovery method of the address translation table as described in the third embodiment, a WRITE disabling step is provided.

In the step 1001, the lower limit from which the disabling of WRITE is started, or the DPBA that is the upper limit PBA up to which data is not erased, is specified. Then, the process proceeds to the step 1002.

In the step 1002, seek is performed to the DPBA, before the process proceeds to the step 710.

In a loop of the step 710, a loop including the steps 1003 and 713 is executed until reaching the upper limit PBA up to which data has been written, and thereby data written to the storage medium of the HDD is disabled.

In the step 1003, the user data 403 and the saved data 405 are disabled by clearing the flag 404 of a block. Here, for the purpose of speedup, the user data 403 and the saved data 405 are disabled only by clearing the flag 404. However, for safety reasons, it is desirable to perform dummy write to a block in which the user data 403 and the saved data 405 are stored, and thereby to erase written data.

Processing performed after the step 701 is similar to the processing after the step 701 shown in FIG. 7 with the exception that the LPBA is replaced with the DPBA.

When disabling WRITE, it is desirable to perform the disabling so that the host can keep the data consistency in the HDD. If the host writes, to the HDD, data indicating a point of time at which the data consistency is kept, it is most reliable. However, in another case, the HDD can find out a candidate of PBA at which the data consistency is kept by the following techniques:

(1) detecting the frequency of issuing a write command by the host;
(2) detecting whether a write command has not been issued for a separately specified period of time after the last write command has been issued; and
(3) if a write command has not been issued for the separately specified period of time, adding an identifier indicating a candidate of PBA at which the data consistency is kept, to the data structure 406 of the flag 404 of the physical block address at which write has been most recently performed.

These steps mean that taking advantage of the fact that an access from the host to the HDD has a burst characteristic because of a disk cache in the host, the end of burst write is considered to be a candidate having the data consistency. In these steps, a candidate of PBA at which the data consistency is kept is selected. Therefore, if WRITE disabling is performed, it is desirable to check the data consistency of the HDD from the host side.

According to this embodiment of the present invention, a write is disabled after writing to the HDD. This produces an effect of making it possible to roll back to a HDD state at an arbitrary point of time. In addition to it, the saved data of the address translation table and a flag of the block that is equivalent to a difference from the saved data are read out to rebuild the address translation table. This produces an effect of rolling back at high speed.

Figure 11:
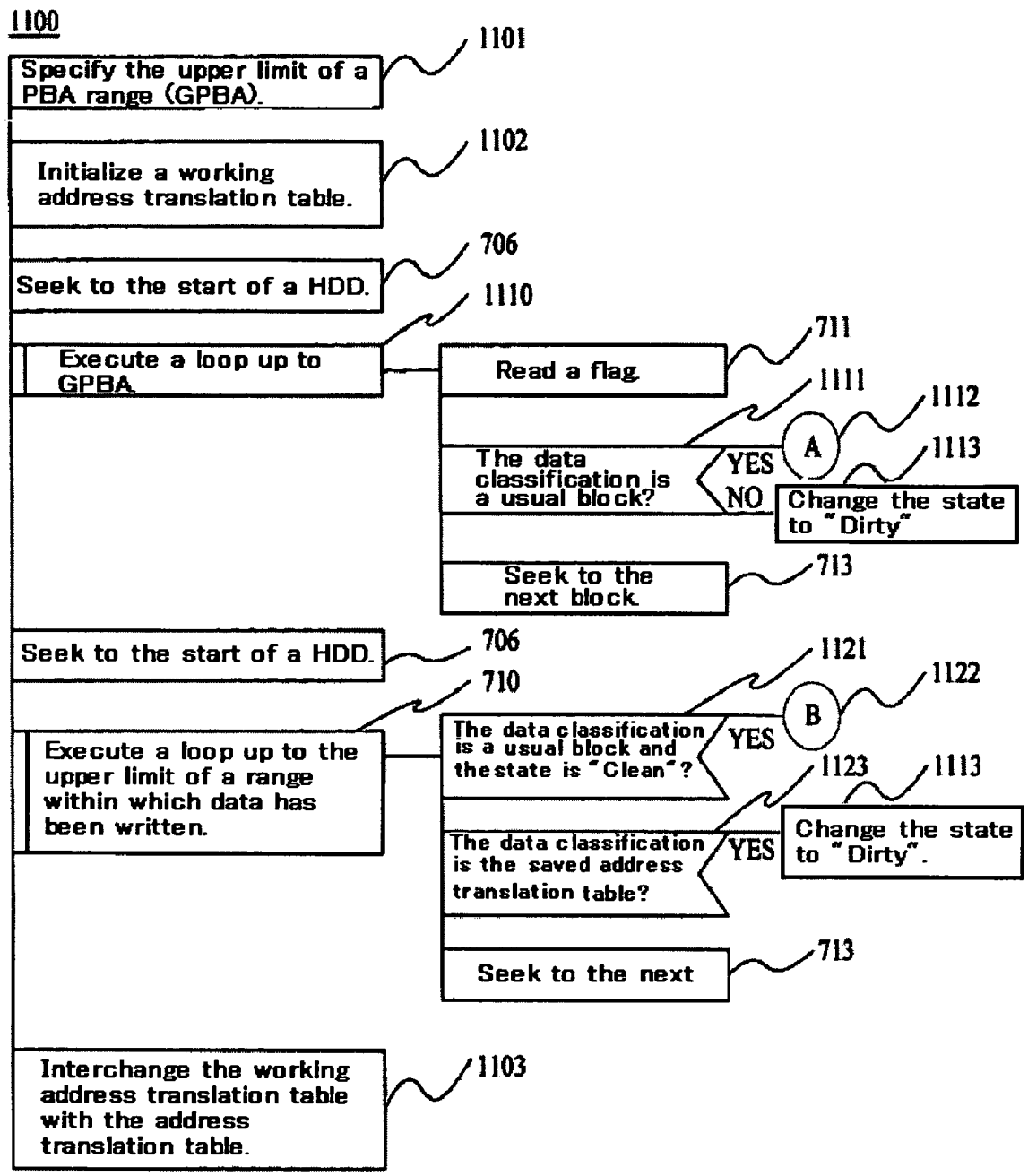
FIG. 11 is a PAD diagram illustrating an area reuse method included in a method for controlling a disk drive according to a seventh embodiment of the present invention.

FIG. 11 is a PAD diagram 1100 illustrating an area reuse method included in a method for controlling a disk drive according to a seventh embodiment of the present invention. Reference numeral 1101 denotes a step for specifying a GPBA that is the upper limit of a PBA range within which reclamation work of used areas is performed; reference numeral 1102 denotes a step for initializing a working address translation table in the cache memory; reference numeral 1110 denotes a step for executing a loop until the GPBA is reached; reference numeral 1111 denotes a step for checking the data classification in the data structure 406 of the flag 404 to judge whether or not the data classification is the user data 403; reference numeral 1112 denotes a subroutine used when the data classification is the user data 403; reference numeral 1113 denotes a step for setting the state in the data structure 406 of the flag 404 at "Dirty"; reference numeral 1121 denotes a step for checking the data classification and the state in the data structure 406 of the flag 404 to judge whether or not they are the user data 403 and "Clean" respectively; reference numeral 1122 denotes a subroutine used when the data classification and the state are the user data 403 and "Clean" respectively; reference numeral 1123 denotes a step for judging whether or not the data classification in the data structure 406 of the flag 404 is the saved data 405; and reference numeral 1103 denotes a step for replacing the address translation table 407 in the cache memory with the working address translation table.

FIG. 12 is a PAD diagram 1200 illustrating the subroutine 1112 of the control method for controlling a disk drive according to the seventh embodiment of the present invention. Reference numeral 1201 denotes a step for reading out the LBA from the data structure 406 of the flag 404; reference numeral 1202 denotes a step for searching for a PBA of a block to which the latest user data 403 has been written corresponding to the LBA; and reference numeral 1203 denotes a step for checking whether or not a block which is currently being handled corresponds to a PBA at which the latest user data 403 is stored.

FIG. 13 is a PAD diagram 1300 illustrating the subroutine 1122 of the control method for controlling a disk drive according to the seventh embodiment of the present invention. Reference numeral 1301 denotes a step for copying a block that is currently being handled, in the direction of decreasing address; reference numeral 1302 denotes a step for changing the PBA in the data structure 406 of the flag 404 to a PBA of an area to which the block has been copied; reference numeral 1303 denotes a step for checking whether or not the size of the working address translation table exceeds a separately specified threshold value; reference numeral 1304 denotes a step for selecting least recently used entries, the number of which is separately specified; reference numeral 1305 denotes a step for saving the selected entries in the storage medium of the HDD; and reference numeral 1306 denotes a step for adding to the working address translation table the correspondence between a LBA and a PBA after the copy.

Figure 19:
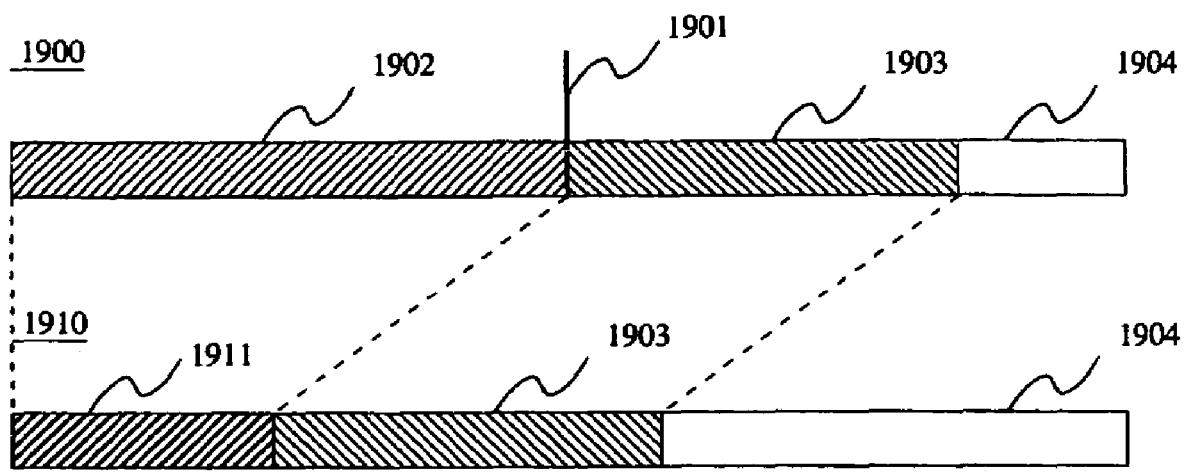
FIG. 19 is a conceptual diagram illustrating an area reuse method of a disk drive according to the seventh embodiment of the present invention.

FIG. 19 is a conceptual diagram illustrating the area reuse method according to the seventh embodiment. In FIG. 19, reference numeral 1900 denotes an image of the address space of the recording medium of the HDD before the area reuse; reference numeral 1901 denotes a GPBA that is the upper limit of a PBA range within which the reclamation work of a used area is performed; reference numeral 1902 denotes a used block targeted for the area reuse; reference numeral 1903 denotes a used block not targeted for the area reuse; reference numeral 1904 denotes an unused block; reference numeral 1910 denotes an image of the address space on the recording medium of the HDD after the area reuse; and reference numeral 1911 denotes a used block whose size has been reduced by the area reuse.

In the control method for controlling a disk drive according to the present invention, all writes to the storage medium of the HDD are performed in time series order. To be more specific, in the conventional control method for controlling the HDD, when repeatedly writing to one and the same LBA, the capacity consumed is only one block. On the other hand, in the control method for controlling a disk drive according to the present invention, the consumed capacity is a plurality of blocks corresponding to the number of times write has been performed. Therefore, in order to effectively use the capacity of the storage medium of the HDD, it is necessary to reclaim the used capacity as needed for enabling reuse. However, if the capacity is reclaimed so as to keep only the current state, the snapshot function and the WRITE disabling function cannot be used. Accordingly, it is necessary to control the reclamation so that the used capacity at or below a certain PBA is reclaimed, whereas the used capacity above this PBA is not reclaimed.

This embodiment is characterized by reclaiming only the used capacity at or below a certain PBA so that the area can be reclaimed while the snapshot function and the WRITE disabling function can be made effective.

A concept of the area reuse will be described with reference to FIG. 19. In the state 1900 before reclaiming a used area, by use of the GPBA that is the upper limit of a PBA range within which the reclamation work of the used area is performed, the used area is divided into a block 1902 targeted for reuse, and a block 1903 not targeted for reuse. The block 1902 targeted for reused is compressed to make a block 1911 by shifting a remaining block to the lower address side so that a block overwritten to be Dirty, more specifically, a block overwritten a higher PBA for the same LBA, is overwritten. Since the block 1902 becomes the block 1911, the block 1903 not targeted for reuse is shifted to the lower address side in a manner that a free block is filled. As a result, an area of the unused block 1904 is extended.

In the step 1101, a GPBA is specified. The GPBA is the upper limit of a PBA range within which the reclamation work of a used area is performed. Next, the process proceeds to the step 1102.

In the step 1102, the working address translation table is initialized. The reason why the working address translation table is provided apart from the address translation table 407 is that it is necessary to allow the execution of the area reuse processing while allowing a usual access to a HDD volume. After the step 1102 ends, the process proceeds to the step 706.

In the step 706, seek is performed to the top of the HDD, and then the process proceeds to a loop of the step 1110.

In the loop of the step 1110, the step 711, the steps 1111 through 1113, and the step 713 are executed from the top of the HDD toward the GPBA. After completing the execution of the loop in the step 1110, the process proceeds to the step 706. In the step 711, the flag 404 is read, before the process proceeds to the step 1111.

In the step 1111, the data classification in the data structure 406 of the flag 404 is read out to check whether or not the data classification is a usual block, i.e., user data. If the data classification is a usual block, the process proceeds to a subroutine of the step 1112. If the data classification is not a usual block, the process proceeds to the step 1113. After the step 1112 or 1113 ends, the process proceeds to the step 713.

In the subroutine of the step 1112, the steps 1201 through 1203 and the step 1113 are executed.

In the step 1201, a LBA of the block is read out from the data structure 406 of the flag 404, before the process proceeds to the step 1202.

In the step 1202, the latest PBA corresponding to the read LBA is searched for, and then the process proceeds to the step 1203.

In the step 1203, a PBA currently being handled is compared with the PBA found as a result of the search. If both of the PBAs are equivalent to each other, more specifically, if the PBA currently being handled is a PBA at which the latest data is saved, the execution of the subroutine 1112 is ended. On the other hand, if the PBAs are not equivalent to each other, the process proceeds to the step 1113.

In the step 1113, the state in the data structure 406 of the flag 404 is changed to "Dirty" indicating that it is not the latest data.

In the step 1111, if the data classification is not a usual block, it is saved data of the address translation table, which cannot be used after the area reuse. Accordingly, the process proceeds to the step 1113 where the state is set at "Dirty".

In the step 706, seek is performed to the top of the HDD, and then the process proceeds to the step 710.

In the step 710, a loop formed of the steps 1121 through 1123, the step 1113, and the step 713 is executed. After completing the execution of the loop in the step 710, the process proceeds to the step 1103.

In the step 1121, the data classification and the state in the data structure 406 of the flag 404 of the block is checked. If the data classification is a usual block, and the state is "Clean", which is not "Dirty", the process proceeds to the step 1122. In other cases, the process proceeds to the step 1123. After the subroutine of the step 1122 ends, the process proceeds to the step 1123.

The subroutine of the step 1122 executes the steps 1301 through 1306.

In the step 1301, a block currently being handled is copied in the direction of the start address of PBA so that it is overwritten to a block, the state of which is "Dirty". After the copy ends, the state of a source block which is currently being handled is changed to "Dirty", and then the process proceeds to the step 1302.

In the step 1302, a PBA value in the flag information 406 of the flag 404 of the copied block is changed to a PBA value of a destination block. Then, the process proceeds to the step 1303.

In the step 1303, a check is made as to whether or not the number of entries written in the working address translation table exceeds a threshold value that is separately specified. If the number of entries exceeds the threshold value, the process proceeds to the step 1304. If the number of entries does not exceed the threshold value, the process proceeds to the step 1306.

In the step 1304, least recently used entries whose number is separately specified are selected. Then, the process proceeds to the step 1305.

In the step 1305, the entries selected in the step 1304 are saved in a block, the state of which is "Dirty", following a block to which in the HDD a most recent block copy has been made. Then, the entries selected from the working address translation table are deleted. After the step 1305 ends, the process proceeds to the step 1306.

In the step 1306, the correspondence between a LBA and a PBA after the copy is added to the working address translation table.

In the step 1123, the data classification in the data structure 406 of the flag 404 of the block is checked. If the data classification is the saved data 405 that is the saved address translation table, the process proceeds to the step 1113. If the data classification is not the saved data 405, the process proceeds to the step 713.

In the step 713, seek is performed to the next block.

After the loop of the step 710 ends, the process proceeds to the step 1103.

In the step 1103, the working address translation table and the address translation table 407 are interchanged so that in an access thereafter, an address translation table whose area reuse processing has been completed can be referred to.

Incidentally, if address conversion is performed in response to an access from the host during the area reuse processing, the address conversion is achieved by the following steps:

(1) converting a LBA into a PBA with reference to the address translation table 407;
(2) checking whether or not a PBA obtained after the conversion is higher than an address being used in the loop 1110 and the loop 710;
(3) if the PBA is higher than the address being used, using the PBA; and
(4) if the PBA is lower than the address being used, using the PBA into which the LBA has been converted with reference to the working address translation table.

According to this embodiment, there is produced an effect of allowing the area reuse processing to be executed while a usual access to a HDD volume is allowed.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for controlling a disk drive including a storage medium; and a control unit that transmits/receives a command and data to/from a host to control write or read to or from the storage medium, said method comprising:

receiving a write command from the host;
reading out a logical block address included in the write command;
when converting the read logical block address into a physical block address of the storage medium, converting the read logical block address into the next physical block address of a physical block address at which data has been written most recently so that data can be written to an unused area of the storage medium in an append manner;
writing data specified by the host at the converted physical block address;
writing a value of the logical block address specified by the host to a management area corresponding to the converted physical block address;
storing as one entry the correspondence between the physical block address and the logical block address in an address translation table in a temporary storage area;
comparing the number of entries stored in the address translation table with the allowable number of entries that is separately specified;
as a result of the comparison, if the number of stored entries exceeds the allowable number of entries, selecting entries to be saved, the number of which is separately specified, from entries that are least recently used, in decreasing order of elapsed time after the last use;
selecting the next physical block address of a physical block address at which a write has been made most recently;
saving, to the storage medium, the address translation table in the temporary storage area by writing contents of the selected entries at the selected physical block address;
writing a flag, indicating that written data is an entry of the address translation table, to a management area corresponding to the selected physical block address;
saving a value of the selected physical block address in the temporary storage area; and
when saving the address translation table on the storage medium, writing to the storage medium not only contents of the selected entries but also a value of a physical block address that was used when the address translation table stored in the temporary storage area has been saved on the storage medium last time.

2. A method for controlling a disk drive according to claim 1, further comprising:

detecting whether or not the host issues a write command for a plurality of consecutive logical block addresses;
if writing at a plurality of consecutive logical block addresses is detected, converting the plurality of consecutive logical block addresses into a plurality of consecutive physical block addresses;
allocating one management area corresponding to the plurality of consecutive physical block addresses; and
writing values of the plurality of consecutive logical block addresses specified by the host to said one management area by an encoding system that can be decoded.

3. A method for controlling a disk drive according to claim 2, wherein the encoding method used when the values of the plurality of consecutive logical block addresses are written to said one management area, using a start logical block address and the size of a consecutive write.

4. A method for controlling a disk drive according to claim 1, further comprising:

storing as one entry the correspondence of the logical block address and the physical block address in an address translation table capable of storing the correspondences of all logical block addresses and all physical block addresses, which can be specified by the host, in a specific area on the storage medium.

5. A method for controlling a disk drive according to claim 4, wherein said address translation table in a specific area on the storage medium is located in a management area on the storage medium.

6. A method for controlling a disk drive according to claim 4, wherein said address translation table in a specific area on the storage medium is located in a user data area on the storage medium.

7. A method for controlling a disk drive according to claim 1, further comprising:

reading out a length of operating time of the disk drive; and
writing the length of operating time that has been read out, to the management area corresponding to the converted physical block address.

8. A method for controlling a disk drive according to claim 7, further comprising:
storing, at the time of retraction of a head, or power off, the length of operating time of the disk drive in the management area;
when starting up the disk drive, reading out the length of operating time stored in the management area; and
initializing the length of operating time of the disk drive by use of the length of operating time that has been read out.

9. A method for controlling a disk drive according to claim 7, further comprising:
reading out a command issued date and time from the write command from the host; and
writing the command issued date and time that has been read out, to the management area corresponding to the converted physical block address.

10. A method for controlling a disk drive according to claim 1, further comprising:
detecting an interval of issuing write commands from the host;
checking whether a write command has not been issued for a separately specified period of time after the host has issued the last write command; and
if the write command has not been issued for the separately specified period of time, adding, to a management area corresponding to a physical block address at which a write has been made most recently, an identifier indicating that the write command has not been issued for the separately specified period of time.

11. A method for controlling a disk drive including a storage medium; and a control unit that transmits/receives a command and data to/from a host to control write or read to or from the storage medium, said method comprising:
initializing an address translation table in a temporary storage area, said address translation table storing as one entry the correspondence between a logical block address and a physical block address;
starting from a physical block address at which a write has been made most recently, searching for a block of the storage medium in which the address translation table has been saved, in the direction of lower physical block address;
reading out the block in which the address translation table has been saved, said block having been found by the searching, and then restoring the address translation table in the temporary storage area by use of the block;
starting from the next physical block address of the saved block toward a physical block address at which a write has been made most recently, reading out a physical block address of the block, and from a management area corresponding to the physical block address, reading out a logical block address that has been specified by the host when writing at the physical block address; and
storing as one entry the correspondence between the physical block address and the logical block address in the address translation table in the temporary storage area,
wherein only when data saved in the block is user data, the physical block address and the logical block address are read out.

12. A method for controlling a disk drive according to claim 11, further comprising:
writing the entry stored in the temporary storage area to a corresponding entry in an address translation table capable of storing the correspondences of all logical block addresses and all physical block addresses, which can be specified by the host, in a specific area on the storage medium.

13. A method for controlling a disk drive including a storage medium; and a control unit that transmits/receives a command and data to/from a host to control write or read to or from the storage medium, said method comprising:
initializing an address translation table in a temporary storage area, said address translation table storing as one entry the correspondence between a logical block address and a physical block address;
starting from the lowest physical block address of the storage medium toward a physical block address at which a write has been made most recently, reading out a physical block address of a block, and from a management area corresponding to the physical block address, reading out a logical block address that has been specified by the host when writing at the physical block address; and
storing as one entry the correspondence between the physical block address and the logical block address in the address translation table,
wherein only when data saved in the block is user data, the physical block address and the logical block address are read out.

14. A method for controlling a disk drive including a storage medium; and a control unit that transmits/receives a command and data to/from a host to control write or read to or from the storage medium, said method comprising:
initializing an address translation table in a temporary storage area, said address translation table storing as one entry the correspondence between a logical block address and a physical block address;
starting from the lowest physical block address of the storage medium toward a physical block address at which a write has been made most recently, searching for a block in which the address translation table has been saved;
reading out the block in which the address translation table has been saved, said block having been found by the searching, and then adding the block to the address translation table in the temporary storage area;
comparing the number of entries stored in the address translation table with the allowable number of entries that is separately specified;
as a result of the comparison, if the number of stored entries exceeds the allowable number of entries, selecting entries to be deleted, the number of which is separately specified, from entries that are least recently used, in decreasing order of elapsed time after the last use;
deleting the selected entries from the address translation table;
starting from the next physical block address of the saved block, which has been read last, toward a physical block address at which a write has been made most recently, reading out a physical block address of the block, and from a management area corresponding to the physical block address, reading out a logical block address that has been specified by the host when writing at the physical block address; and
storing as one entry the correspondence between the physical block address and the logical block address in the address translation table in the temporary storage area
wherein only when data saved in the block is user data, the physical block address and the logical block address are read out.

15. A method for controlling a disk drive including a storage medium; and a control unit that transmits/receives a command and data to/from a host to control write or read to or from the storage medium, said method comprising:

setting a value of the upper limit physical block address to be handled on the storage medium;

starting from the lowest physical block address toward the upper limit physical block address to be handled, for each block, checking whether or not the host is writing at a physical block address higher than the physical block address for the same logical block address as a value of the logical block address that has been specified by the host when writing at a physical block address of the block;

if the host is writing at the higher physical block address, writing, in a management area corresponding to the block, a dirty flag indicating that written data at the same logical block address is overwritten by the higher physical block address; and starting from the lowest physical block address toward a physical block address at which a write has been made most recently, for each block, moving a block having no dirty flag in the direction of a lower physical block address so that the block having a dirty flag is overwritten.

16. A method for controlling a disk drive including a storage medium; and a control unit that transmits/receives a command and data to/from a host to control write or read to or from the storage medium, said method comprising:

setting a value of the upper limit physical block address to be handled on the storage medium;

initializing a second address translation table in a temporary storage area, said address translation table storing as one entry the correspondence between a logical block address and a physical block address;

starting from the lowest physical block address toward the upper limit physical block address to be handled, reading out a physical block address of a block, and from a management area corresponding to the physical block address, reading out a logical block address that has been specified by the host when writing at the physical block address;

storing as one entry the correspondence between the physical block address and the logical block address in the second address translation table; and when receiving a request from the host, enabling a mechanism to access the storage medium, said mechanism performing address conversion between a physical block address and a logical block address by use of the second address translation table.

17. A method for controlling a disk drive including a storage medium; and a control unit that transmits/receives a command and data to/from a host to control write or read to or from the storage medium, said method comprising:

setting a value of the lower limit physical block address to be handled on the storage medium;

starting from the lower limit physical block address to be handled toward a physical block address at which a write has been made most recently, disabling written blocks for initialization;

initializing an address translation table in a temporary storage area, said address translation table storing as one entry the correspondence between a logical block address and a physical block address;

starting from the lowest physical block address toward the lower limit physical block address to be handled, reading out a physical block address of a block, and from a management area corresponding to the physical block address, reading out a logical block address that has been specified by the host when writing at the physical block address; and storing as one entry the correspondence between the physical block address and the logical block address in the address translation table.

18. A method for controlling a disk drive including a storage medium; and a control unit that transmits/receives a command and data to/from a host to control write or read to or from the storage medium, said method comprising:

receiving from the host a write command or a read command that accesses a logical block address which does not exist on the storage medium;

checking whether or not the logical block address is an address for receiving a control command;

if the logical block address is an address for receiving a control command, and at the same time, if the received command is a write command, reading out data in a data area of the write command;

checking whether or not the data is a control command of the disk drive;

if the data is a control command, executing the control command;

if the logical block address is an address for receiving a control command, and at the same time, the received command is a read command, reading out management information of the storage medium corresponding to the received logical block address; and transmitting the read management information to the host.

19. A method for controlling a disk drive including a storage medium; and a control unit that transmits/receives a command and data to/from a host to control write or read to or from the storage medium, said method comprising:

checking whether or not a command received from the host is a read command that requests a direct reference to an internal data structure of the storage medium;

if the command is a read command requesting a direct reference, seeking to an address that has been specified by the host as a logical block address, as a physical block address on the storage medium;

reading out user data stored in a block, and management data stored in a management area corresponding to the block; and transmitting the user data and the management data to the host.

20. A method for controlling a disk drive including a storage medium; and a control unit that transmits/receives a command and data to/from a host to control write or read to or from the storage medium, said method comprising:

checking whether or not a command received from the host is a read command for reading management data stored in a management area of the storage medium;

if the command is a read command for reading management data, reading out management data stored in a management area corresponding to a block, an address specified by the host as a logical block address being used as a physical block address in the storage medium; and transmitting the management data to the host.

21. A method for controlling a disk drive including a storage medium; and a control unit that transmits/receives a command and data to/from a host to control write or read to or from the storage medium, said method comprising:

receiving a read command from the host;

reading out a logical block address included in the read command;

reading out an entry corresponding to the logical block address from an address translation table in a temporary storage area, said address translation table storing as one entry the correspondence between a logical block address and a physical block address;

reading out a physical block address from the read entry;

reading out data at the physical block address of the storage medium;

transmitting the read data to the host;

reading out a logical block address that has been specified when the host has written at the physical block address, from a management area corresponding to the physical block address;

comparing the logical block address read out from the read command with the logical block address read out from the management area; and as a result of the comparison, if the logical block addresses disagree with each other, returning an error to the host.

22. A method for controlling a disk drive according to claim 21, further comprising:

if an entry corresponding to the logical block address does not exist in the address translation table in the temporary storage area, searching an address translation table saved on the storage medium for the entry corresponding to the logical block address.

* * * * *